United States Patent

Hirabayashi et al.

[19]

[11] Patent Number: 5,874,904
[45] Date of Patent: Feb. 23, 1999

[54] INTER-VEHICLE DISTANCE MEASUREMENT APPARATUS

[75] Inventors: Takehide Hirabayashi; Hideo Shimizu; Taichi Tanigawa; Akihiko Okabe; Takayuki Usuda, all of Tokyo, Japan

[73] Assignee: Fuji Electric Co., Ltd., Kawasaki, Japan

[21] Appl. No.: 908,588

[22] Filed: Aug. 8, 1997

[30] Foreign Application Priority Data

Aug. 14, 1996 [JP] Japan .................................. 8-214424

[51] Int. Cl.⁶ ...................................................... G08G 1/16
[52] U.S. Cl. ........................ 340/903; 340/435; 340/436; 340/942; 348/118; 348/148; 382/106
[58] Field of Search ..................... 340/435, 436, 340/901, 903, 905, 942; 348/143, 148, 149, 118, 119, 135, 139, 169, 170; 382/107, 106, 140

[56] References Cited

U.S. PATENT DOCUMENTS

| | | | |
|---|---|---|---|
| 5,309,137 | 5/1994 | Kajiwara | 340/903 |
| 5,424,952 | 6/1995 | Asayama | 340/903 |
| 5,515,448 | 5/1996 | Nishitani | 340/435 |
| 5,663,705 | 9/1997 | Pretorius et al. | 340/435 |
| 5,684,474 | 11/1997 | Gilon et al. | 340/435 |

*Primary Examiner*—Daniel J. Wu
*Attorney, Agent, or Firm*—Kanesaka & Takeuchi

[57] ABSTRACT

An inter-vehicle distance to a preceding or following vehicle is reliably determined by using a simple processing, to alert the following vehicle to approach a dangerous range. The distance measurement apparatus includes a pair of light-receiving devices disposed on image-forming surfaces of lenses and having sensor lines and measurement windows on each sensor line at a certain interval, a distance detection device, a white line detection device and a vehicle detection device. The distance detection device detects distances at points, the coordinates of which are specified by the sensor line numbers and measurement window addresses. By using the detection results, the white line detection device detects a sensor line in which a white line on a road surface is present. By using the detection results obtained from the distance detection device relating to the sensor lines in which the white line is not present, the vehicle detection device checks a presence of a vehicle and outputs information on the inter-vehicle distance and the direction of the vehicle. The following vehicle may be alerted by flashing the brake lights.

7 Claims, 21 Drawing Sheets

INTER-VEHICLE DISTANCE MEASUREMENT APPARATUS

BACKGROUND OF THE INVENTION AND RELATED ART STATEMENT

The present invention relates to an inter-vehicle distance measurement apparatus, which carries out simple processing to confirm the presence of a vehicle and to reliably determine the inter-vehicle distance to a preceding or following vehicle, and detects the dangerous approach of the following vehicle based on the inter-vehicle distance to the following vehicle and the speed of its own vehicle to alert the following vehicle by, e.g. flashing the brake light.

In the apparatus, m × n distance information is obtained by using a light-receiving device with (m) optical sensor arrays disposed such that the longitudinal direction is approximately aligned with the vertical direction, each of the (m) sensor arrays having (n) measurement windows spaced at a pixel interval. The apparatus detects from the m × n distance information, a white line on a road surface to limit the area in which a vehicle may be present, and confirms the presence of the vehicle.

In the drawings filed in the application, the same reference numerals designate the same or equivalent components.

In the known inter-vehicle distance measurement apparatuses, images formed by two lateral optical systems are electrically compared to measure the distance based on the principle of triangulation.

FIG. 24 shows a conventional inter-vehicle distance measurement apparatus. In this figure, image forming lenses 1 and 2 are disposed at an optical axis interval B. Optical sensor arrays 3A and 4A are, for example, CCD linear sensor arrays and are each located at a focal length (f) from the image forming lens 1 or 2. The optical sensor arrays 3A and 4A convert an image of a target 13' formed by the image forming lenses 1 and 2 into image signals 30A and 40A and output to a signal processing section 5.

The signal processing section 5 comprises amplifiers 51 and 52; A/D converters 53 and 54; and a storage or memory device 55. The image signals 30A and 40A from the optical sensor arrays 3A and 4A are amplified by the amplifiers 51 and 52, converted into digital data by the A/D converters 53 and 54, and then outputted to the storage device 55 as image data 31A and 41A.

A distance measurement circuit 6 disposed on the output side of the signal processing section 5 comprises a microcomputer, which compares the lateral image data 31A and 41A stored in the storage device 55 to calculate the distance to the target 13', and outputs a result as a distance signal 9.

Next, a principle of the calculation of the distances is described with reference to FIG. 25. A horizontal axis X and a vertical axis Y are set by using a midpoint of the image forming lenses 1 and 2 as an origin O, and the coordinates of the image forming positions $L_1$ and $R_1$ are referred to as $(-a_{L1}-B/2, -f)$ and $(a_{R1}+B/2, -f)$, respectively, wherein $a_{L1}$ and $a_{R1}$ are distances on the optical sensor arrays 3A and 4A as illustrated.

The coordinates of the midpoint $O_L$ of the image forming lens 1 are $(-B/2, 0)$, and the coordinates of the midpoint $O_R$ of the image forming lens 2 are $(B/2, 0)$. If the coordinates of a point M in the target 13' are referred to as (x, y), the coordinates of the intersection N of a vertical line extending from the point M to the X-axis are (x, 0), the coordinates of position $L_O$ of a vertical line extending from a point $O_L$ to the optical sensor array 3A are $(-B/2, -f)$, and the coordinates of a position $R_O$ of a vertical line extending from a point $O_R$ to the optical sensor array 4A are $(B/2, -f)$. In this case, since $\Delta MO_L N$ is similar to $\Delta O_L L_1 L_O$, and $\Delta MO_R N$ is similar to $\Delta O_R R_1 R_O$, the following equations (1) and (2) are satisfied:

$(x+B/2)f=(a_{L1}+B/2-B/2)y$      Equation 1

$(-x+B/2)f=(a_{R1}+B/2-B/2)y$      Equation 2

The following Equation (3) can be obtained from Equations (1) and (2).

$y=B \cdot f/(a_{L1}+a_{R1})$      Equation 3

By Equation (3), the distance (y) to the target 13' can be obtained if the distances $a_{L1}$ and $a_{R1}$ for the image forming positions L1 and R1 are known.

Next, the operation of the distance detection circuit 6 is described in detail. The distance detection circuit 6 compares lateral or right and left image data 3AT and 4AR such as that shown by the solid lines in FIG. 26 with respect to separately set measurement window parts, and if they do not match, for example, the image data 3AL on the left is sequentially shifted to the right, while the image data 4AR on the right is sequentially shifted to the left, as shown by the broken lines in the figure. The shift distance is then detected when the image data on the right and left match.

An evaluation function is used to determine the degree of coincidence between the right and left image data 3AL and 4AR. The evaluation function is obtained by adding the absolute values of the differences between pixel data for all pixels (in this example, CCD elements) located at corresponding coordinates (addresses) in measurement windows located Within the optical sensor arrays 3A and 4A on the right and left. The value of the evaluation function is examined while the right and left measurement windows are sequentially shifted, that is, the left measurement window is shifted to the left (image data 3AL on the left is equivalently shifted to the right), whereas the right measurement window is shifted to the right (image data 4AR on the right is equivalently shifted to the left). The data on the right and left is determined to match when the function has a minimum value.

The distances $a_{L1}$ and $a_{R1}$ for the right and left image forming positions $L_1$ and $R_1$ described above are equal to these shifted distances, so the distance detection circuit 6 can calculate the distance (y) to the target 13' based on the shifted distances $a_{L1}$ and $a_{R1}$ through the use of Equation (3) shown above.

The conventional principle of the measurement of a plurality of points in the longitudinal direction of the optical sensor arrays is described with reference to FIG. 27. The distance measurement apparatus in this case has the same structure as in FIG. 24 except that each sensor array is partitioned into a plurality of regions, i.e. measurement windows. FIG. 27 shows a case in which the optical sensor arrays are partitioned into three regions (a), (b) and (c).

Targets $O_1$, $O_2$ and $O_3$ for which the distance is to be measured are located at the distances $L_1$, $L_2$ and $L_3$, respectively, from the distance measurement apparatus, in the three directions shown by the alternating long and short lines, that is, the direction of the center line and the directions with an angle α on both sides of the center line. The regions (a), (b) and (c) which form pairs between the optical sensor arrays 3A and 4A correspond to the targets $O_1$, $O_2$ and $O_3$, respectively.

In other words, an image of the target $O_1$ located left at the angle α relative to the center line is simultaneously formed in the pair of regions (a) of the optical sensor arrays 3A and 4A, an image of the target $O_2$ located at the center line is simultaneously formed in the two regions (b), and an image of the target $O_3$ located right at the angle $\alpha$ relative to the center line is simultaneously formed in the two regions (c). The distances $L_1$, $L_2$ and $L_3$ to the targets $O_1$, $O_2$ and $O_3$ can be expressed by the following Equations (4) to (6):

$$L_1 = B \cdot f/(U_{21} - U_{11}) \quad \text{Equation 4}$$

$$L_2 = B \cdot f/(U_{22} + U_{12}) \quad \text{Equation 5}$$

$$L_3 = B \cdot f/(U_{13} - U_{23}) \quad \text{Equation 6}$$

Distances B, (f), $U_{11}$, $U_{12}$, $U_{13}$, $U_{21}$, $U_{22}$ and $U_{23}$ in these equations are as shown in FIG. 27.

Since each shift distance ($U_{21}$, $U_{11}$, $U_{22}$, $U_{12}$, $U_{13}$, or $U_{23}$) can be determined by the distance detection circuit 6 based on the image data from the optical sensor arrays 3A and 4A, the distances $L_1$, $L_2$ and $L_3$ can be determined by Equations (4) to (6).

In this manner, the conventional method measures the distance for each of the plurality of the measurement windows set within the optical sensor arrays to extract the location of a vehicle by using the following techniques.

For example, according to the technique disclosed in Japanese Patent Application Laid-Open No. 8-210848, which is the applicant's previous application (hereinafter referred to as "first previous application"), (n) measurement points are measured in the lines (hereinafter referred to as "sensor lines") in each of (m) sensor arrays to which (n) measurement windows are allocated, and the frequency distribution of the distances within the m × n distance matrix is determined. The average movement of a distance block region corresponding to a size of a vehicle is then determined within the distance matrix, and an object assumed to be a vehicle is identified. Finally, its distance is extracted.

In addition, according to the technique disclosed in Japanese Patent Application Laid-Open No. 7-280563, which is another applicant's application (hereinafter referred to as the "second previous application"), a white line is distinguished based on the distance to and the width of an image assumed to be the white line on the surface of a road on which the vehicle is traveling. Then, based on the white line, the distance measurement range is determined to detect the distance to a vehicle within the range.

In addition, the well-known inter-vehicle distance measurement apparatus includes a buzzer to alert the driver if the inter-vehicle distance determined in the above manner is smaller than a safe inter-vehicle distance calculated based on tale speed of the vehicle and the relative speed, and laser radar distance measurement apparatuses have been practically used for some large trucks.

FIG. 23 shows how the safe inter-vehicle distance is determined based on the speed of its own vehicle and the relative speed. This figure shows the relationship between the speed of the vehicle and the safe inter-vehicle distance at a particular relative speed. When the speed of its own vehicle is referred to as $V_2$; the speed of the preceding car is referred to as $V_1$, the deceleration of the preceding car is referred to as $\alpha_1$; the deceleration of its own vehicle is referred to as $\alpha_2$; the delay time (free running time) from the start of the deceleration of the preceding vehicle until the start of the deceleration of the original vehicle is referred to as $T_{delay}$; and the margin of the distance (inter-vehicle distance when both vehicles are completely stopped) is referred to as $D_1$; the relative speed can be expressed as $V_2 - V_1$ and the safe inter-vehicle distance $D_{safe}$ can be expressed by the following Equation (7):

$$D_{safe} = (3/2\alpha_2)V_2^2 - (3/2\alpha_1)(V_1 - \alpha_1 \cdot T_{delay})^2 + (V_2 - V_1) \cdot T_{delay} + D_1 \quad \text{Equation 7}$$

In this equation, $V_2$ is obtained from a vehicle speed signal from a vehicle speed sensor installed in the own vehicle, and $V_1$ is determined based on the inter-vehicle distance and the vehicle speed signal. $D_1$ is fixed as a certain constant. In addition, $T_{delay}$, $\alpha_1$, and $\alpha_2$ are constants but vary depending on the driver's driving skills and the conditions of the road surface. Thus, these values must be determined while considering these factors.

The conventional inter-vehicle distance measurement apparatus has the following problems:

FIG. 28 shows an example of an inconvenient relationship between an image of a vehicle and measurement windows within the sensor lines in a plurality of optical sensor arrays installed parallel approximately in a vertical direction as the longitudinal direction. According to the distance measurement apparatus according to the first previous application (Japanese Patent Application Laid-Open No. 8-210848), the measurement windows are provided at the circles as a center in each line in FIG. 28 to measure the distances. The size of an image of the vehicle formed on a measurement visual field decreases as the inter-vehicle distance increases. As shown in the figure, the image of the vehicle may be offset from the center of the measurement window and present only in a part of it, depending on the situation, to make measurement of the distance to the vehicle inaccurate or difficult.

To prevent such an inconvenience, for example, the following methods can be used:

A first method is to increase the width of the measurement window so that an image of the vehicle formed in a corner of the window can be used to determine the distance to the vehicle despite the absence of the vehicle in the center of the window. This method, however, causes an image of the vehicle and images of the background and road surfaces to be shown in the same window, resulting in a larger error in the measurement of the distance due to the mixture of far and near objects.

A second method is to increase the number of the measurement windows instead of increasing the width in order to guarantee that a certain number of windows is used to detect the distance to the vehicle. This method, however, increases the amount of distance data to be obtained to thereby require a long time to extract frequency distributions or determine the average movement. Consequently, it requires a CPU with a larger capacity to reduce the processing time, resulting in high costs.

Thus, a method that prevents errors caused by the mixture of far and near objects and that can extract the location of a vehicle by using simple processing is required.

A possible method for reducing the processing time required to extract the location of a vehicle is to use the technique disclosed in the second previous application (Japanese Patent Application Laid-Open No. 7-280563) to detect a white line on a road surface in order to determine the distance measurement range based on that white line, thereby determining the processing range within which the location of a vehicle is to be extracted. This method, however, can reduce the time required to extract the location of a vehicle, but a longer time is required to detect the white line due to the use of the image data, thereby preventing the required reduction of the sampling frequency. Thus, a more simple processing method that eliminates the need for image data in the detection of the white line is required.

Furthermore, according to the conventional method, the following inconvenience occurs when the inter-vehicle distance determined in the above manner is used to output an alarm. In the conventional method in which an alarm is outputted when the inter-vehicle distance apparatus described above has measured the distance to the preceding vehicle, an alarm is frequently outputted when the inter-vehicle distance has become smaller than the safe inter-vehicle distance, which bothers the driver and makes the driver to be accustomed.

To prevent this, the alarm determination threshold in Equation (7) must be determined appropriately to clearly distinguish the dangerous condition from the safe condition in order to make the alarm more reliable.

The constants $T_{delay}$, $\alpha_1$ and $\alpha_2$ in Equation (7), however, vary depending on the various parameters, such as driver's driving skills, habits and physical condition; conditions and slopes of the road surfaces; and abrasion of tires. These factors can not be measured easily, and the alarm is likely to be outputted even in a safe situation. Thus, an inter-vehicle distance measurement apparatus that is acceptable to the driver due to its ability to prevent the driver from being bothered and can consistently alert the driver to potential danger is required.

It is thus an object of the invention to solve these problems of the conventional techniques and to provide an inter-vehicle distance measurement apparatus that uses light receiving devices with optical sensor arrays to stably, accurately and simply determine the distance to the preceding or following vehicle and that prevents the driver from being bothered while sufficiently alerting the driver to potential danger.

SUMMARY OF THE INVENTION

To accomplish this object, in a first invention, an inter-vehicle distance measurement apparatus or distance measurement apparatus (12) according to a first aspect includes a pair of light receiving devices (3 and 4) comprising (m) optical sensor arrays (31 to 3m and 41 to 4m) disposed in parallel at a specified interval in such a way that the longitudinal direction of the optical sensor arrays substantially become the vertical direction. The light receiving devices are disposed in the longitudinal direction of the optical sensor arrays on image forming surfaces corresponding to a pair of parallel optical axes (AX) of an optical system (image forming lenses 1 and 2). The apparatus determines the inter-vehicle distance (DV) from its own or first vehicle to a preceding (13A) or following vehicle (13B), i.e. second vehicle, based on image data (311 to 31m and 411 to 41m) from the optical sensor arrays in the pair of the light receiving devices.

The apparatus is basically formed of distance detection means, white line detection means, and vehicle detection means.

The distance detection means or distance detection circuit 6 detects measurement distances for m × n points as a distance signal 9, the coordinates of which are specified by sensor line numbers and measurement window addresses, by using (n) measurement windows (WD) located on each of (m) optical sensor array lines or sensor lines.

The white line detection means or white line extraction section 7 is connected to the distance detection means. The white line detection means detects, through detection results obtained by the distance detection means, an optical sensor array among the (m) optical sensor arrays in which an image of a white line (BL) is present on a surface of a road where a first vehicle is traveling.

The vehicle detection means or vehicle extraction section 8 is connected to the white line detection means and the distance detection means. The vehicle detection means detects a presence of the second vehicle through detection results of the distance detection means for an optical sensor array among the (m) optical sensor arrays where an image of the white line is absent, and detects an inter-vehicle distance to the second vehicle and vehicle direction information 11.

An inter-vehicle distance measurement apparatus according to a second aspect uses an inter-vehicle distance measurement apparatus of the first aspect, wherein the interval set for the measurement windows on the sensor lines is equal to the interval between the optical sensors in the optical sensor array.

An inter-vehicle distance measurement apparatus according to a third aspect uses an inter-vehicle distance measurement apparatus in a first or second aspect, wherein the white line detection means detects a white line by examining a correlation in the sensor lines between a measured distance ($L(W_i min)$) at which a measurement window is located at the lowest position among the measured distances ($L(W_i)$) that are detected on the sensor lines (line number(i) ($1 \leq i \leq m$)) and the address ($W_i min$) of that measurement window.

An inter-vehicle distance measurement apparatus according to a fourth aspect is based on an inter-vehicle distance measurement apparatus according to any of the first to third aspects, wherein the vehicle detection means determines whether a nearest measured distance corresponds to a vehicle candidate or a road surface, for all the sensor lines in which an image of the white line is absent, by using a measured distance ($L(W_i min)$ or nearest measured distance at which a measurement window is located at the lowest position among the measured distances ($L(W_i)$) that are detected on the sensor line (line number(i) ($1 \leq i \leq m$)); and a measurement distance ($L(W_i up)$) for the measurement window at the address ($W_i up$) higher than the address ($W_i min$) or starting-point window address of the measurement window by a number of addresses ($\Delta W up$) at least corresponding to the height (minimum height of the vehicle H) of a vehicle possibly present at this nearest measured distance. If it corresponds to a vehicle candidate, the vehicle detection means determines the nearest measured distance as the vehicle candidate distance (LVehicle(i)) and the relevant sensor line as the vehicle detection candidate sensor line.

If it corresponds to a road surface, the vehicle detection means calculates the relationship (road surface equation $f_{iroad}(W_i)$) between the address of each higher measurement window based on a starting point window address and the distance to the road surface expected for that address to compare the calculated distance to the expected road surface with the corresponding measured distance in order to determine whether the vehicle candidate is present at a distance greater than the nearest measured distance. If so, the vehicle detection means determines the measured distance to the vehicle candidate ($L(W_i min)$) for use as the vehicle candidate distance (LVehicle(i)) and the relevant sensor line as the vehicle detection candidate sensor line.

The vehicle detection means confirms that the difference between the maximum (L#MAX) and minimum (L#MIN) numbers of the vehicle detection candidate sensor lines corresponds to the width (WIDTHVehiclemax to WIDTHVehiclemin) of the vehicle possibly present at the vehicle candidate distance and determines that the vehicle candidate is an actual vehicle.

An inter-vehicle distance measurement apparatus according to a fifth aspect includes a pair of light receiving devices comprising one or more optical sensor arrays disposed in parallel at a specified interval. The light receiving devices are disposed in the longitudinal direction of the pair of optical sensor arrays on image-forming surfaces corresponding to a pair of parallel optical axes of an optical system. The apparatus determines the inter-vehicle distance (DV) to a following vehicle (13B) based on image data from the optical sensor arrays in the pair of the light receiving devices.

The apparatus includes alarm output determination means (alarm determination section 16) to determine the dangerous approach of the following vehicle based on the inter-vehicle distance to the following vehicle and the speed (vehicle speed signal LB) of the first vehicle detected by a vehicle speed sensor 17. The alarm output determination means informs the following vehicle of the danger by flashing the lights of the original vehicle via an ON/OFF signal 19.

An inter-vehicle distance measurement apparatus according to a sixth aspect is based on the inter-vehicle distance measurement apparatus according to the fifth aspect, wherein the alarm output determination means provides on and off signals to a switch (SW20) connected in parallel to a brake switch (21) operated by a driver to flash a brake light (22).

An inter-vehicle distance measurement apparatus according to a seventh aspect is based on the inter-vehicle distance measurement apparatus according to the fifth aspect, wherein the alarm output determination means provides on and off signals to a switch (SW24) to flash a light (another light 23) different from the brake light that is located where the driver in the following vehicle can easily see the light (23).

In the invention, the distances for the (n) measurement windows set in the (m) optical sensor arrays on one side of the vehicle are measured, and these m × n pieces of the measured distance information are used to determine the sensor lines, in which a white line is present. The measured distance information on the sensor lines other than those in which a white line is present is then used to extract the location of a vehicle in order to determine the distance to it and its direction (first aspect).

In addition, by setting the interval between the measurement windows on each sensor line so that it is equal to the interval between the sensors (pixels), continuous distance data is obtained at this pixel interval in the longitudinal direction of the optical sensor arrays (second aspect).

In addition, after the distance data and the address of the measurement window with the lowest address on each sensor line have been determined, the data is referred to as $L(W_i min)$ and $W_i min$ at line number i ($1 \leq i \leq m$), and the inter line relationships among the data are examined to detect sensor lines in which a white line is present. Namely, the white line on the road surface is detected. (third aspect).

In addition, after the distance data ($L(W_i min)$) and the measurement window address $W_i min$ for each of the sensor lines (line number (i) ($1 \leq i \leq m$)) other than those in which the detected white line is present have been determined to indicate a vehicle candidate (image) or a road surface (image), the sensor line (i) is assumed to be a vehicle detection candidate sensor line if the distance data and the address indicate a vehicle candidate.

If the distance data and the address indicate a road surface, the relationship between the address of each measurement window higher than the measurement window address $W_i min$ and the distance to the expected road surface at that address is calculated, and the calculated distance to the expected road surface is compared to the corresponding measured distance to check the presence of a vehicle candidate. If a vehicle candidate is present, the sensor line (i) is determined to be a distance detection candidate sensor line.

When the distance between the maximum and minimum values of the numbers of the vehicle detection candidate sensor lines corresponds to the width of the vehicle, the vehicle candidate is determined to be an actual vehicle (fourth aspect).

In a second invention, the distance to the following vehicle is measured, and if the following vehicle comes within a dangerous range, the lights of the first vehicle are flashed to inform the following vehicle of the danger (fifth aspect). In this case, the brake lights of the first vehicle are flashed to inform the following vehicle of the danger, even when the driver does not apply the brakes (sixth aspect). Regardless of whether the driver applies the brakes, a light different from the brake light that is located where it can easily be seen by the driver of the following vehicle is flashed to inform the following vehicle of the danger (seventh aspect).

DETAILED DESCRIPTION OF PREFERRED EMBODIMENTS

An inter-vehicle distance measurement apparatus according to a first invention is described with reference to FIGS. 1 to 18.

Figure 1:
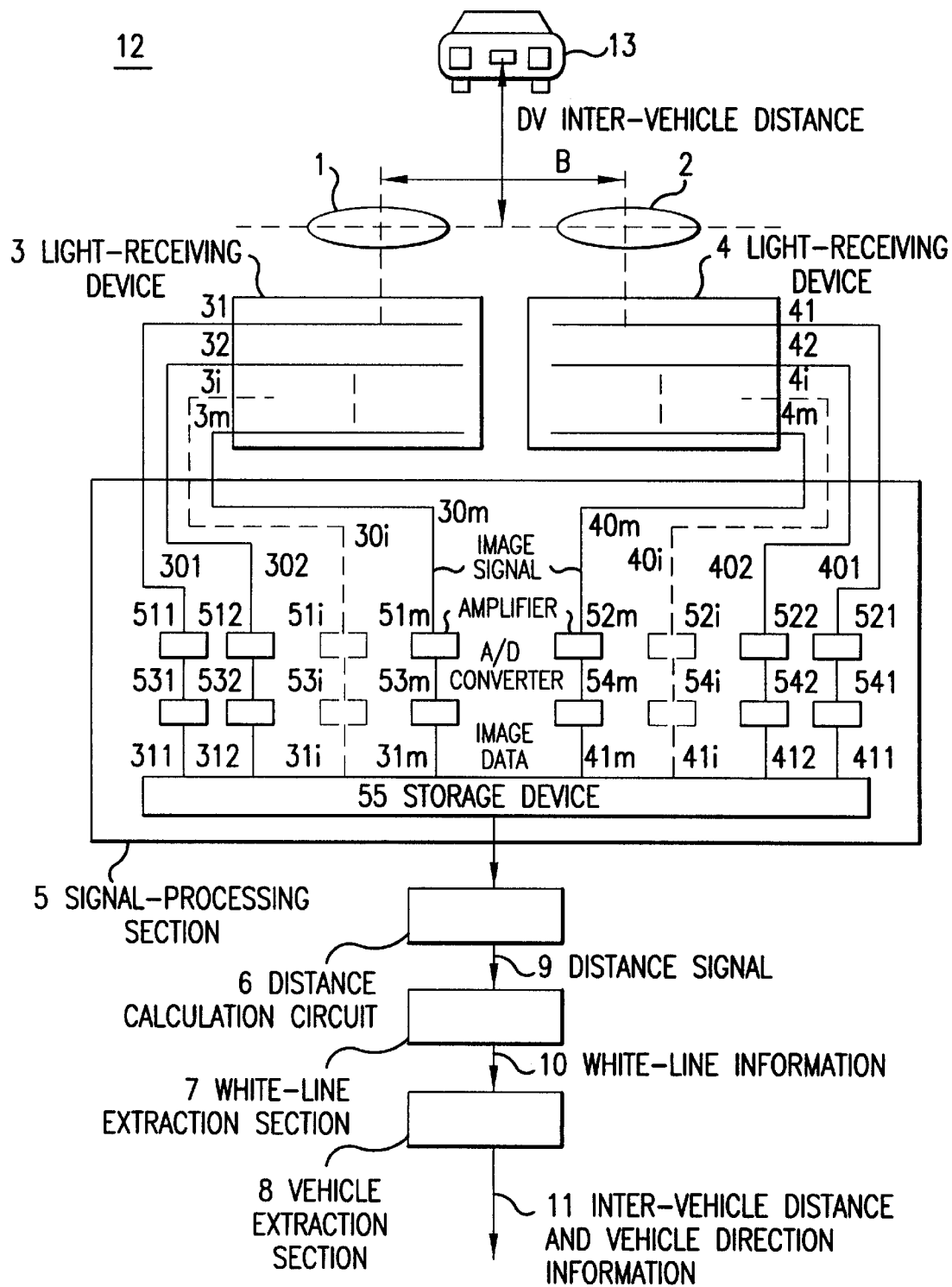
FIG. 1 is a block diagram showing a structure of a main part of a first embodiment of the invention.

FIG. 1 is a block diagram showing a structure of an inter-vehicle distance measurement apparatus as an embodiment of the first invention. In this figure, a vehicle 13 to which the inter-vehicle distance is to be measured is traveling in the same lane as a vehicle with the measurement apparatus (not shown).

Image forming lenses 1 and 2 are disposed at an optical axis interval B, and light receiving devices 3 and 4 are disposed at a focal distance (f) (not shown). The light receiving device 3 comprises (m) optical sensor arrays 31 to 3m disposed parallel in a plane perpendicular to the optical axis in such a way that the longitudinal direction is approximately aligned with the vertical direction, and the light receiving device 4 similarly comprises (m) optical sensor arrays 41 to 4m disposed parallel in a plane perpendicular to the optical axis in such a way that the longitudinal direction is approximately aligned with the vertical direction. The optical sensor arrays are arranged in such a way that the optical sensor arrays 31 and 41, 3i and 4i, and 3m and 4m have the same visual field, respectively.

An image of a target formed by the image forming lens 1 is converted into image signals 301 to 3m by the optical sensor arrays 31 to 3m in the light receiving device 3, and an image of the target formed by the image forming lens 2 is converted into image signals 401 to 40m by the optical sensor arrays 41 to 4m in the light receiving device 4. The image signals are then outputted to a signal processing section 5, respectively.

The signal processing section 5 comprises amplifiers 511 to 51m and 521 to 52m; A/D converters 531 to 53m and 541 to 54m; and a storage device or memory 55. The image signals 301 to 30m from the optical sensor arrays 31 to 3m of the light receiving device 3 are amplified by the amplifiers 511 to 51m, converted into digital data by the A/D converters 531 to 53m, and then outputted to the storage device 55 as image data 311 to 31m.

Likewise, the image signals 401 to 40m from the optical sensor arrays 41 to 4m of the light receiving device 4 are amplified by the amplifiers 521 to 52m, converted into digital data by the A/D converters 541 to 54m, and then outputted to the storage device 55 as image data 411 to 41m.

As in the conventional example, a distance detection circuit 6 comprises a microcomputer that calculates the distance to the target, or a part of it, for each measurement window within the visual field of each pair of the sensor arrays 31 and 41, 3i and 4i, and 3m and 4m, from the right and left image data 311 and 411, 31i and 41i, and 31m and 41m stored in the storage device 55.

FIGS. 15 to 18 show a simple calculation method by using fewer calculations, in which the distance detection circuit 6 uses an evaluation function to continuously determine the distance to the image for each of the plurality of the measurement windows positioned in the longitudinal direction of the optical sensor arrays.

As explained in the Prior Art, in determining an image forming position (distance thereto) $a_{L1}+a_{R1}$ in Equation (3) to calculate the distance to the target, an evaluation function that represents the degree of coincidence between the right and left images is calculated, and a shift value that minimizes the value of the evaluation function is used to determine the image forming position $a_{L1}+a_{R1}$.

Figure 15:
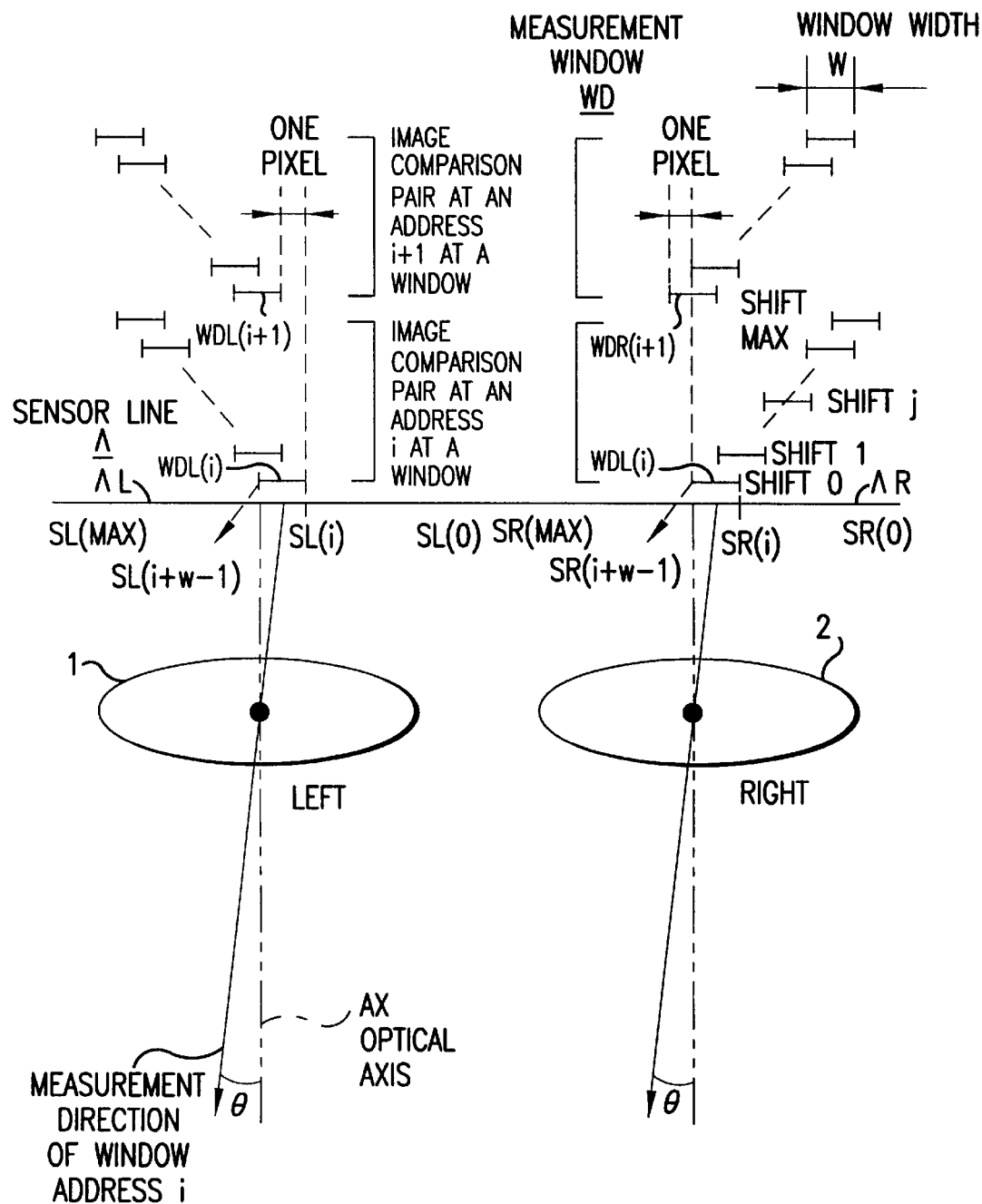
FIG. 15 shows a measurement principle for continuously measuring a plurality of points in the longitudinal direction of optical sensor arrays.

A(AL, AR) in FIG. 15 indicates sensor lines showing a certain pair of optical sensor arrays on the light receiving devices 3 and 4 of the inter-vehicle distance measurement apparatus. The sensor pixels (and their pixel data) on the right sensor line AR are referred to as SR(O), SR(i), . . . , SR(max) from the outside (right side in the figure, and the sensor pixels on the left sensor line AL are referred to as SL(O), SL(i), . . . , SL(max) from the inside (right side in the figure). The value in parenthesis added to each sensor pixel (and pixel data) SR and SL is the number (address) of the sensor pixel.

WD (WDR(i), WDL(i)) indicates a pair of measurement windows with window address values (i) which are located on the respective sensor lines AR and AL and which have widths (w) of, for example, 20 pixels. The pixels to the far right within the pair of measurement windows are SR(i) and SL(i) when the shift distance of the measurement windows is zero.

In measuring the distances, while sequentially moving the right and left measurement windows to the WDR(i) and WDL(i) right and left, respectively, one pixel at a time, as shown in this figure, the evaluation function is calculated as described below to determine the shift distance when the images on the right and left match, i.e. the value of the evaluation function reaches its minimum.

WDR(i+1) and WDL (i+1) indicate a pair of measurement windows with window address values (i+1) that are similarly set adjacent to the measurement windows WDR(i) and WDL(i), respectively. The pixels to the far right within the pair of measurement windows WDR(i+1) and WDL (i+1) are SR(i+1) and SL(i+1) (not shown) when the shift distance of the measurement windows is zero. In this manner, the setting interval between the measurement windows WD is set to be equal to that of a single sensor (single pixel) on the sensor line Λ.

The measurement windows WD on the sensor line Λ are not positioned near both ends of the sensor line so that the range of the width (w) of the measurement window remains within the sensor line even when the shift value is at its maximum.

A method for calculating the evaluation function is described. As shown in FIG. 15, the distances in the directions at an angle θ from the optical axes AX of the image forming lenses 1 and 2 are assumed to be measured by using the pair of the measurement windows WDR(i) and WDL(i). When the shift distance of the measurement window relative to this position (in pixels) is referred to as (j) and the width of the measurement window (in pixel) is referred to as (w), the evaluation function (f) (i, j) for the window address value (i) and the shift amount (j) can be expressed as follows:

$$f(k, j) = |SR(i-j) - SL(i+j)| + \\ |SR(i+1-j) - SL(i+1+j)| + \\ |SR(i+2-j) - SL(i+2+j)| + \\ \cdot \\ \cdot \\ \cdot \\ |SR(i+w-1-i) - SL(i+w-1+j)| \quad \text{Equation 8}$$

In addition, when the measurement windows WDR (i+1) and WDL (i+1) are used and the distance measurement direction θ is continuously shifted by one pixel, i.e. the window address value is shifted from (i) to (i+1), the evaluation function f(i+1, j) can be expressed as follows:

$$f(i+1, j) = |SR(i+1-j) - SL(i+1+j)| + \\ |SR(i+2-j) - SL(i+2+j)| + \\ \cdot \\ \cdot \\ \cdot \\ |SR(i+w-1-j) - SL(i+w-1+j)| + \\ |SR(i+w-i) - SL(i+w+j)| \quad \text{Equation 9}$$

Thus, the relationship in the following Equation (10) can be obtained from Equations (8) and (9):

$$f(i+1, j) = f(i, j) - \\ |SR(i-j) - SL(i+j)| + \\ |SR(i+w-j) - SL(i+w+j)| \quad \text{Equation 10}$$

Figure 16A:
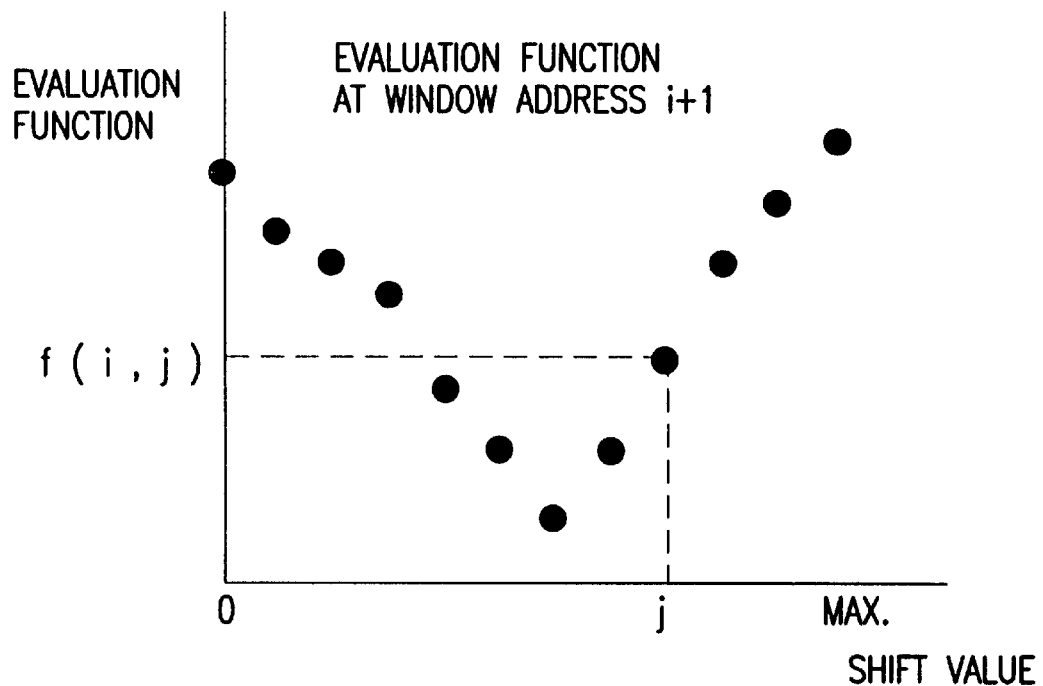
FIG. 16(A) and 16(B) show evaluation functions used to continuously measure a plurality of points in the longitudinal direction of the optical sensor arrays.
Figure 16B:
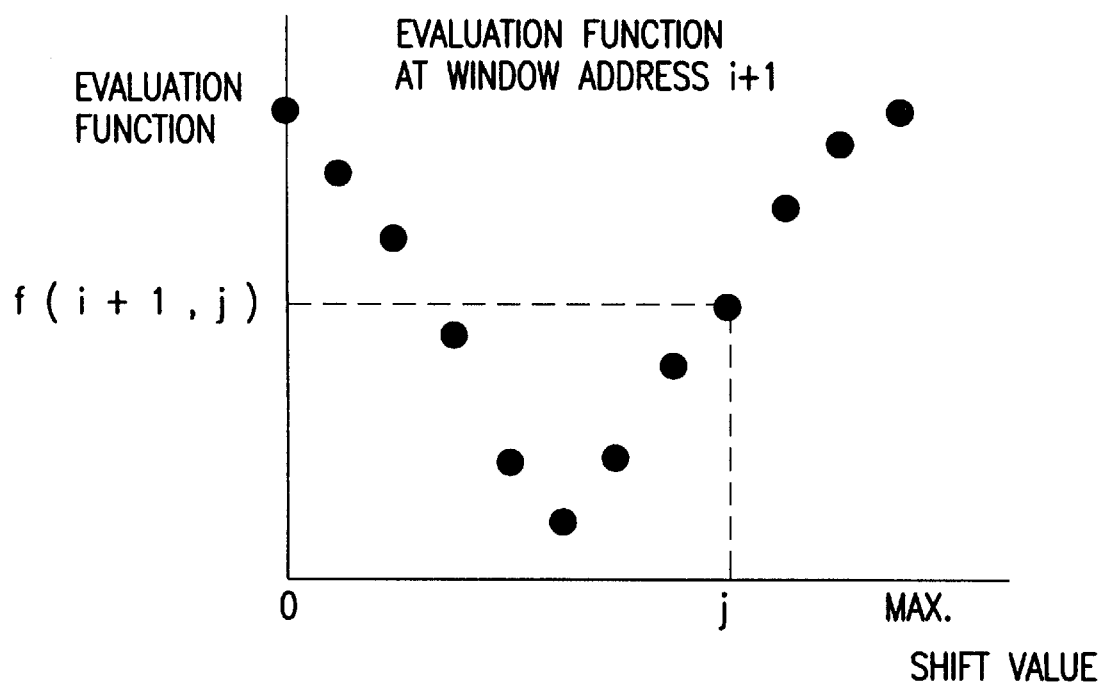
Figure 17:
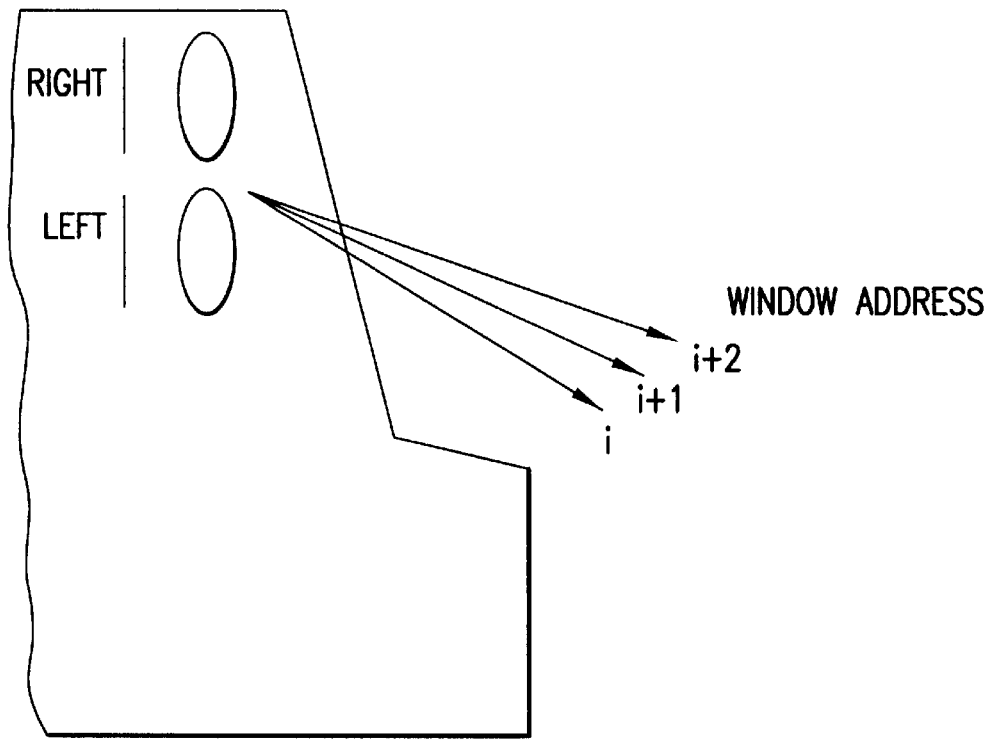
FIG. 17 illustrates an example of the distance measurement apparatus installed to continuously measure a plurality of points in the longitudinal direction of the optical sensor arrays.

FIG. 16(A) shows an example of the relationship between the evaluation function f(i, j) and the shift value (j) for the window address value (i), and FIG. 16(B) shows an example of the relationship between the evaluation function f(i+1, j) and the shift value (j) for the window address value (i+1). In this manner, the evaluation function for the window address value (i) as shown in FIG. 16(A), as well as Equation (10), can be used to simply calculate the evaluation function for the window address value (i+1) as shown in FIG. 16(B).

Thus, if the distances for the plurality of measurement windows in the longitudinal direction of the optical sensor arrays are continuously measured in the order of the window addresses, Equation (10) can be used to reduce the number of calculations to be required. The shift distance at which the evaluation functions in FIGS. 16(A) and 16(B) are at their minimum indicates the image forming position, and the image forming position $a_{L1}+a_{R1}$ in Equation (3) is actually represented by the shift distance obtained as shown in FIGS. 16(A) and 16(B) plus constant values, such as temperature characteristics and assembly errors. This shift distance that provides a minimum evaluation function is determined to be an actual value through interpolation.

Figure 18:
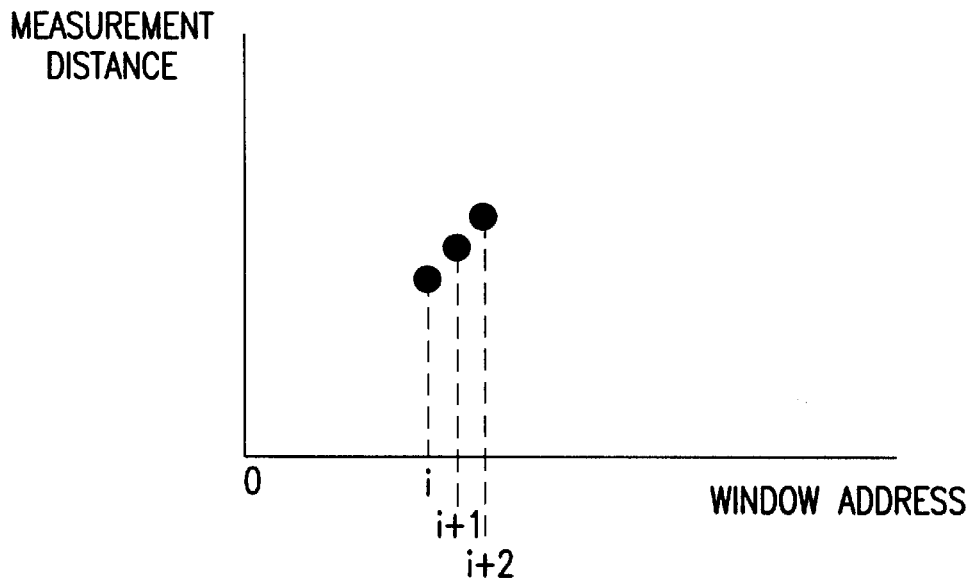
FIG. 18 illustrates a distance information obtained by the distance measurement apparatus in FIG. 17.

If the inter-vehicle distance measurement apparatus according to this invention is installed as described above and shown in FIG. 17, continuous distance information can be obtained for each sensor line, as shown in FIG. 18, in which the horizontal axis indicates the window address and the vertical axis indicates the measured distance.

Returning to FIG. 1, the distance information obtained by the distance detection circuit 6 is transmitted to the white line extraction section 7 as a distance signal 9.

Figure 2:
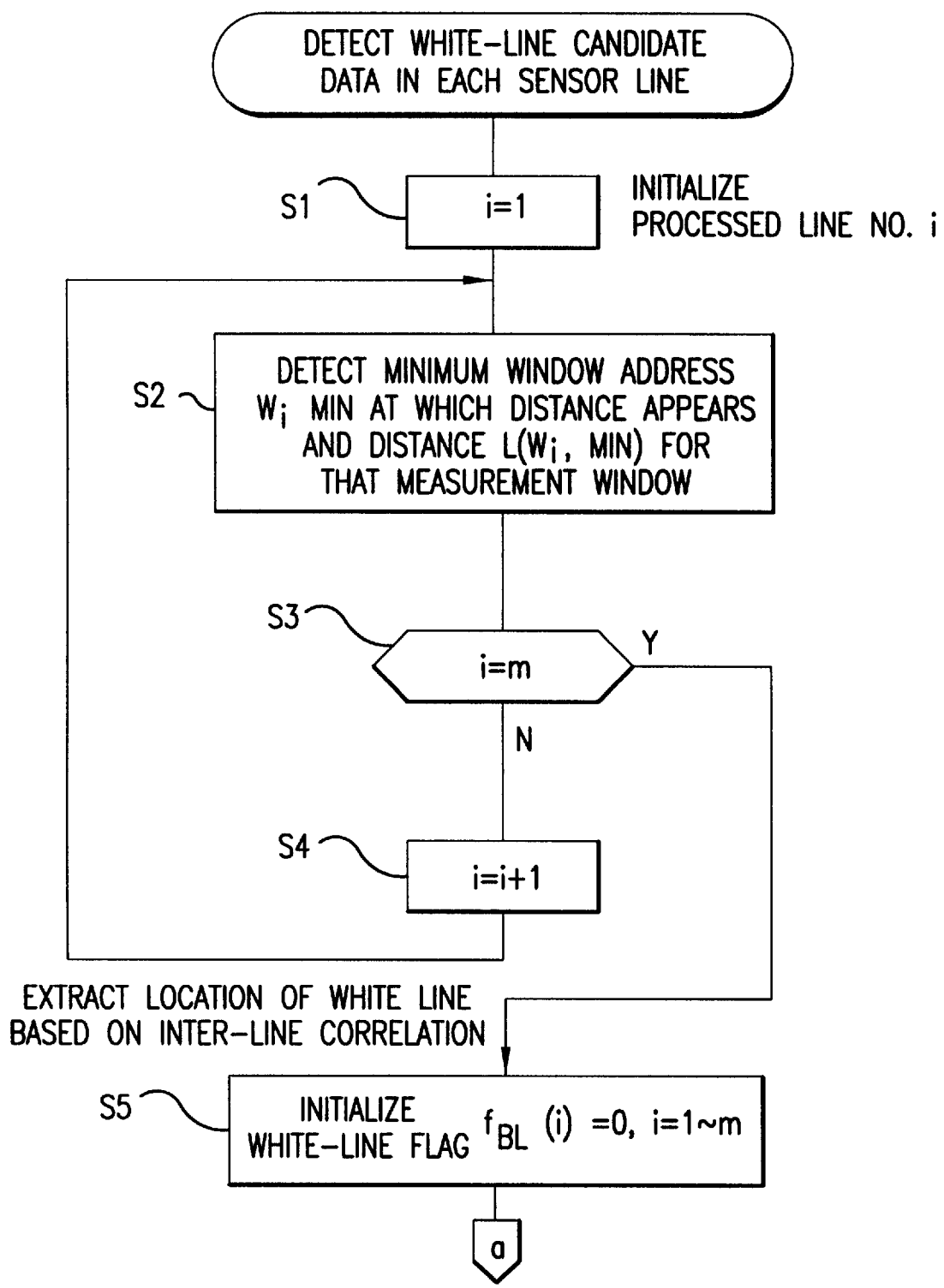
FIG. 2 is a flow chart showing the first half of a processing procedure executed by a white line extraction section in FIG. 1.
Figure 3:
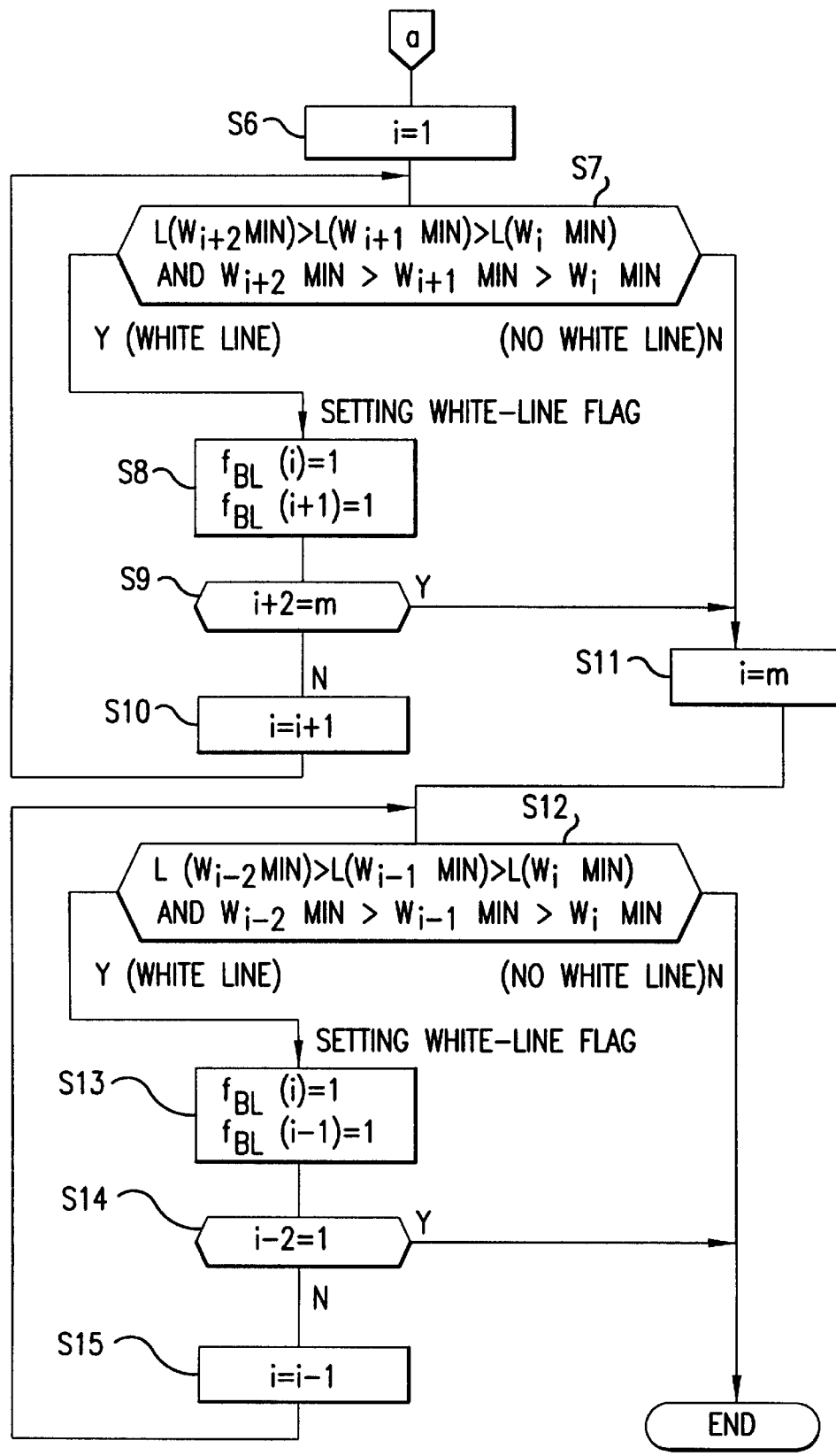
FIG. 3 is a flow chart showing the latter half of the processing procedure executed by the white line extraction section in FIG. 1.
Figure 4:
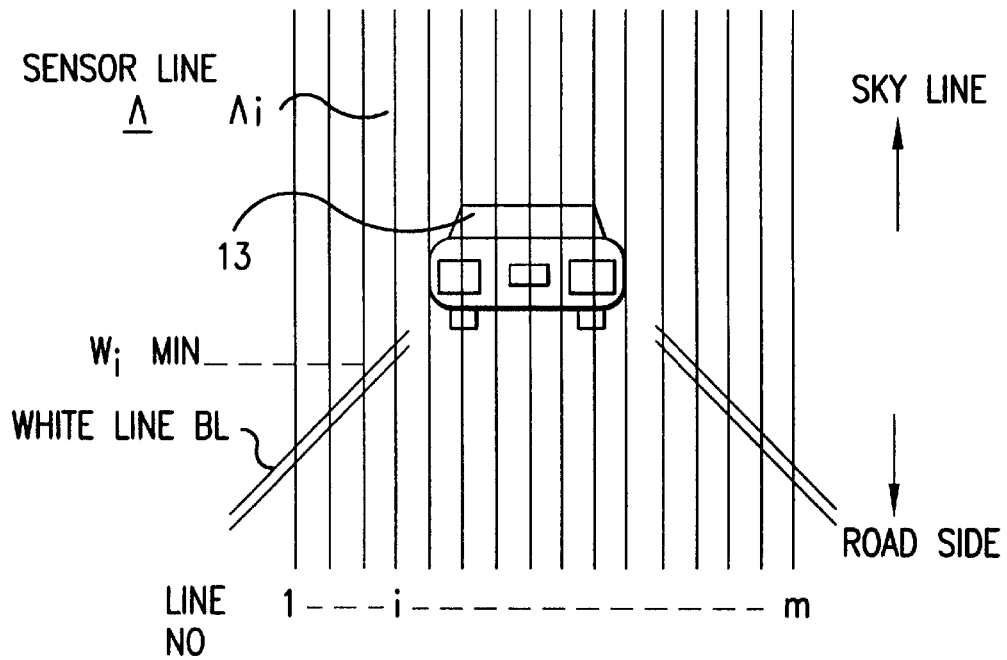
FIG. 4 shows an image of a white line and a vehicle on a road surface formed on a plurality of sensor lines, for illustrating the processing of the white line extraction section in FIG. 1.
Figure 5:
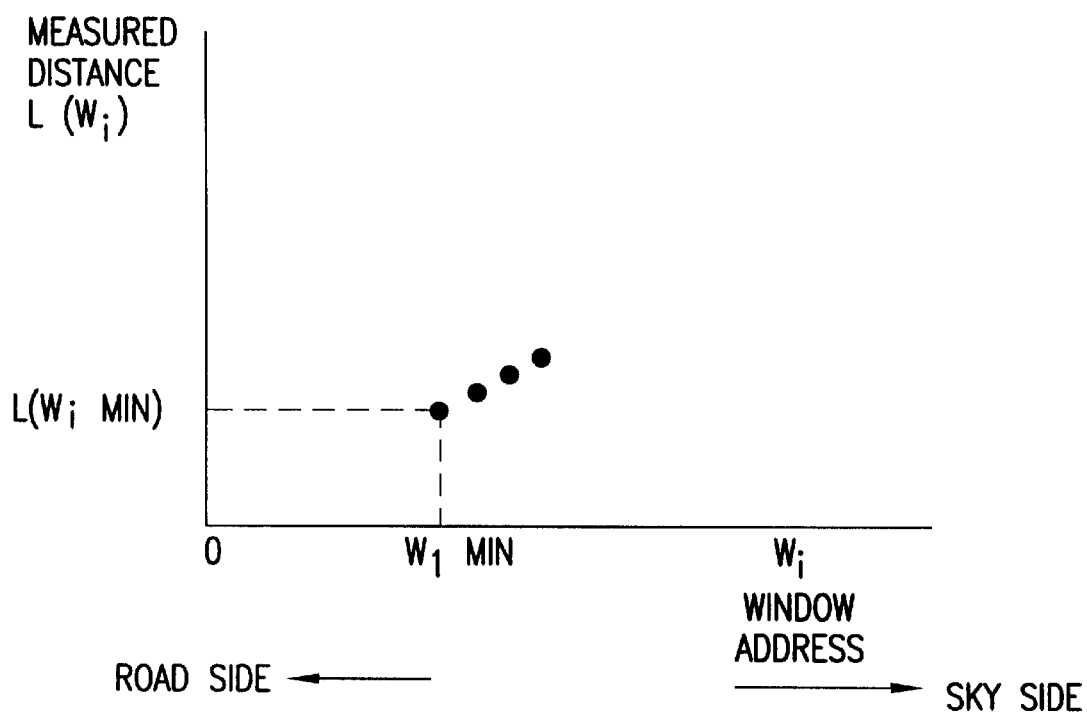
FIG. 5 shows an example of measured distances for each window address on sensor lines, for illustrating the processing of the white line extraction section in FIG. 1.

FIGS. 2 and 3 are flow charts showing processing in which the white line extraction section 7 detects white line candidate data based on the distance information for each sensor line. S1 to S15 indicate the steps of this method. In addition, FIG. 4 shows an example of an image of a white line BL and a preceding vehicle 13 captured by the (m) sensor lines Λ disposed in such a way that the longitudinal direction is aligned with the vertical direction, and FIG. 5 shows an example of the distances measured at the window address $W_i$ on the sensor line Λ (hereinafter referred to as Λi) with line number (i). With reference to FIGS. 4 and 5, the processing flow in FIGS. 2 and 3 is described.

In FIG. 4, each of the (m) sensor lines Λ with line number 1 to m (hereinafter referred to as line No.) in the optical sensor arrays disposed such that the longitudinal direction is aligned with the vertical direction, has a distance information featuring continuous pixel intervals, that has been determined by the distance detection circuit 6. For example, if an image, such as that shown in FIG. 4 is captured, the distance measurement results, such as those shown in FIG. 5, can be obtained on the sensor line Λi, wherein the horizontal axis indicates the window address $W_i$ ((i) indicates a line number), while the vertical axis indicates the measured distance $L(W_i)$ corresponding to the window address $W_i$.

In this case, the white line BL on the road surface lies on the sensor line No. i, and if it is assumed that there is no pattern on the road surface on the near side of the white line, the window address at which the distance to the white line with a high contrast appears is generally represented by the minimum window address $W_i$min. In this case, the distance measured by the measurement window with the minimum window address $W_i$min is referred to as $L(W_i$min$)$.

Such an operation is performed for all sensor lines $\Lambda i$ (i=1 to m), and data $W_i$min, $L(W_i$min$)$ that may be a candidate for the white line BL is extracted for each line No. (FIG. 2, S1 to S4).

Next, the inter-sensor-line correlation among this data $W_i$min, $L(W_i$min$)$ is examined to extract the entire white line BL. That is, a white line flag $f_{BL}$ (i) is provided for each of the (m) sensor lines $\Lambda i$ (for i=1 to m when the parameter of the line No. is (i)) and is initialized to zero (FIG. 2, S5).

If the white line BL is actually present, in case the value (i) of the line No. is incremented by 1 starting from 1 toward (m) while the minimum window address $W_i$min and the corresponding measured distance $L(W_i$min$)$ are examined in FIG. 4, these two values should sequentially increase.

Conversely, if the value (i) is decreased by 1 starting from (m) toward 1 while $W_i$min and $L(W_i$min$)$ are examined, these two values should also sequentially increase. The determination in the former case is carried out herein by using the following Expression (11), as shown in the flow chart in FIG. 3.

$$L(W_{i+2}\text{min}) > L(W_{i+1}\text{min}) > L(W_i\text{min}), \text{ and} \qquad \text{Expression 11}$$

$$W_{i+2}\text{min} > W_{i+1}\text{min} > W_i\text{min}$$

If the above expressions are satisfied, the white line is considered to be present on the sensor lines with line numbers (i) and (i+1), and the white line flags $f_{BL}$ (i) and $f_{BL}$ (i+1) corresponding to these line numbers are set to 1 (FIG. 3, S7 and S8). This processing is carried out for all the sensor lines (FIG. 3, S6, S9 and S10).

In the later case, the determination is carried out by using the following Expression (12), as shown in the flow chart in FIG. 3.

$$L(W_{i-2}\text{min}) > L(W_{i-1}\text{min}) > L(W_i\text{min}), \text{ and} \qquad \text{Expression 12}$$

$$W_{i-2}\text{min} > W_{i-1}\text{min} > W_i\text{min}$$

If the above expressions are satisfied, the white line is considered to be present on the sensor lines with line numbers (i) and (i−1), and the white line flags $f_{BL}$ (i) and $f_{BL}$ (i−1) corresponding to these line numbers are set to 1 (FIG. 3, S12 and S13). This processing is carried out for all the sensor lines (FIG. 3, S11, S14 and S15).

Figure 6:
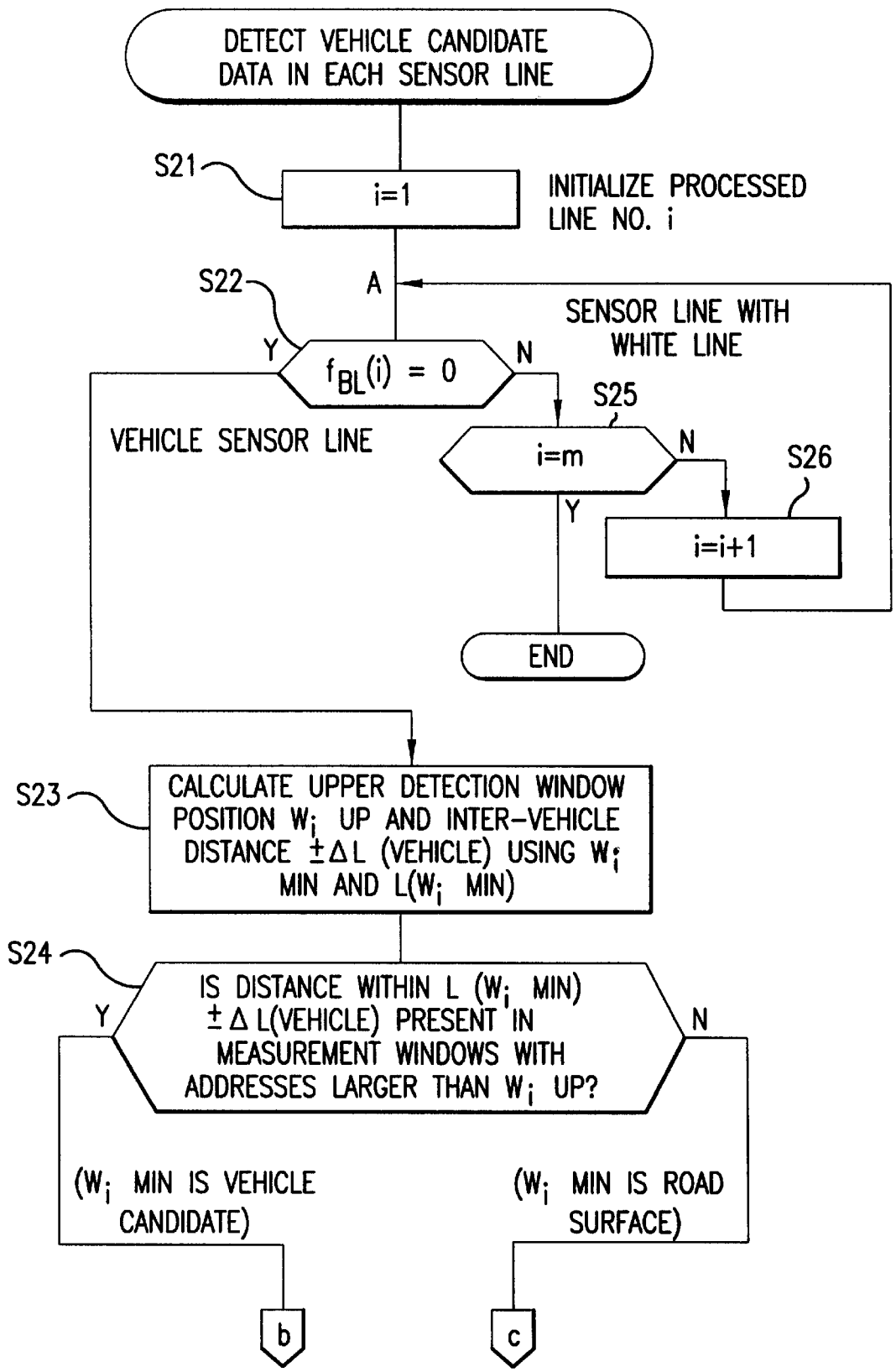
FIG. 6 is a flow chart showing the first half of a procedure executed by a vehicle extraction section in FIG. 1 to detect vehicle candidate data on each sensor line.
Figure 7:
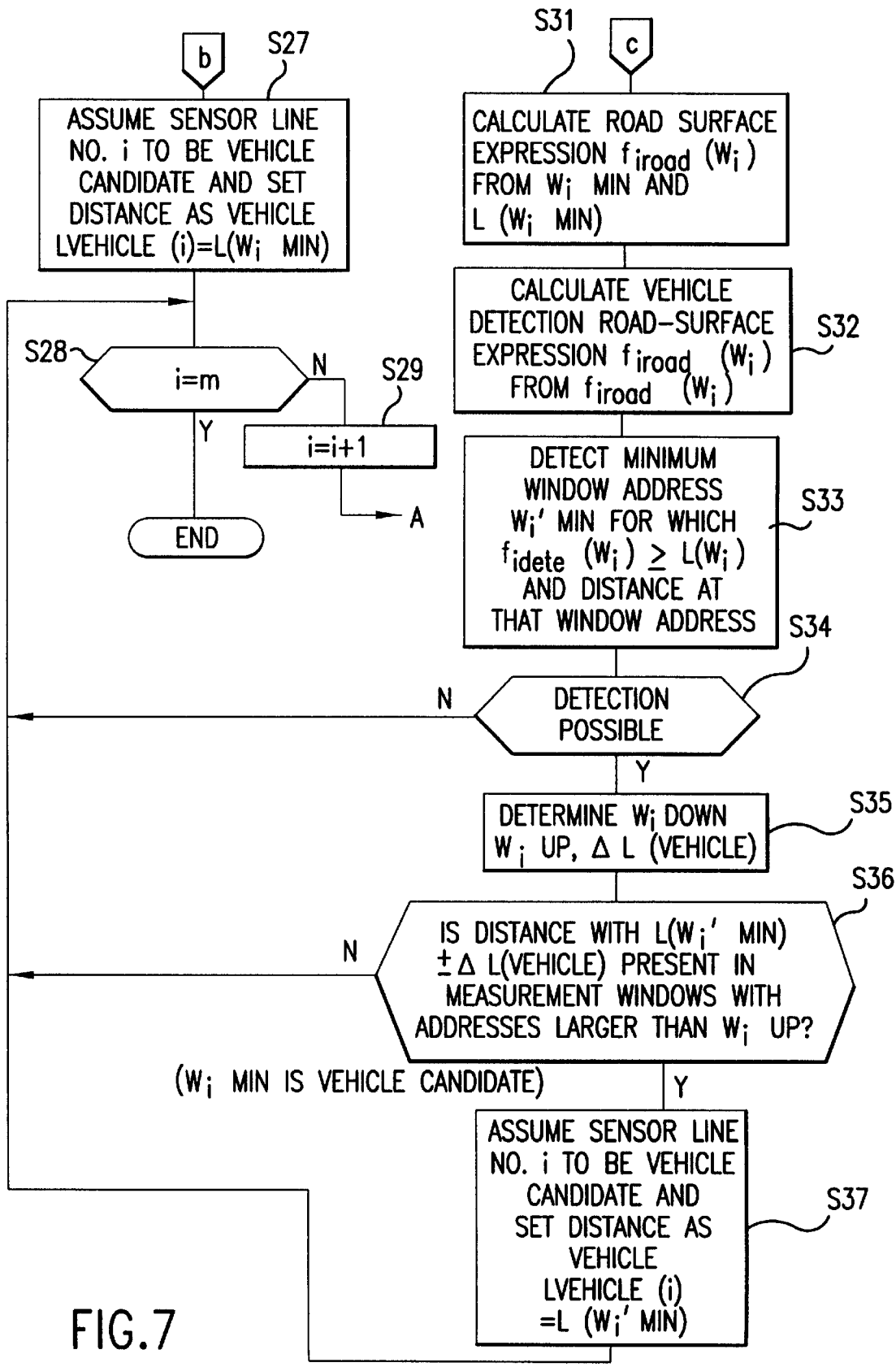
FIG. 7 is a flow chart showing the latter half of the procedure executed by the vehicle extraction section in FIG. 1 to detect vehicle candidate data on each sensor line.

Returning to FIG. 1, white line information 10 obtained in this manner by the white line extraction section 7 is transmitted to a vehicle extraction section 8. FIGS. 6 and 7 are flow charts showing processings in which the vehicle extraction section 8 detects vehicle candidate data from the distance information for each sensor line. S21 to S37 indicate the steps in FIGS. 6 and 7. In addition, FIG. 8 is a flow chart showing processing in which the vehicle extraction section 8 detects a vehicle based on the correlation among the sensor lines, and S41 to S51 indicate the steps in FIG. 8.

Figure 8:
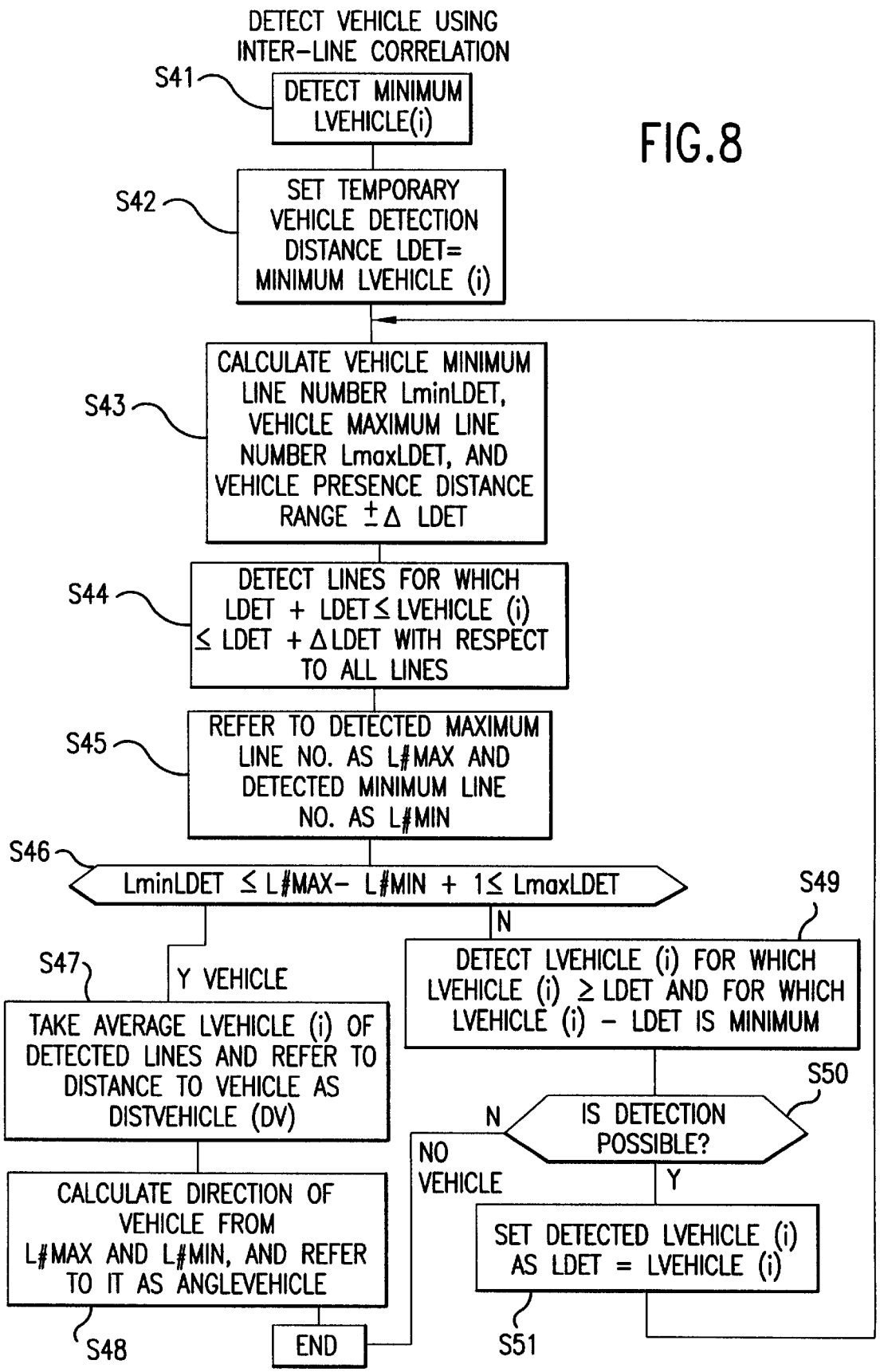
FIG. 8 is a flow chart showing a procedure executed by the vehicle extraction section in FIG. 1 to detect a vehicle by checking a correlation among the sensor lines.
Figure 9:
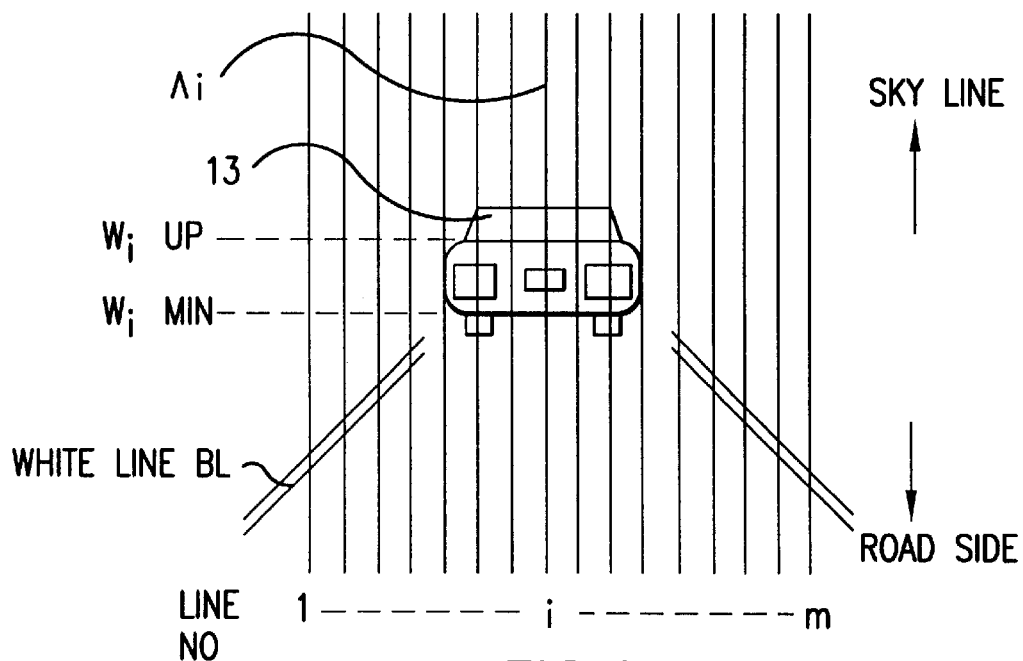
FIG. 9 shows an image of a white line and a vehicle on a road surface formed on a plurality of sensor lines, for illustrating processing executed by the vehicle extraction section in FIG. 1.
Figure 10:
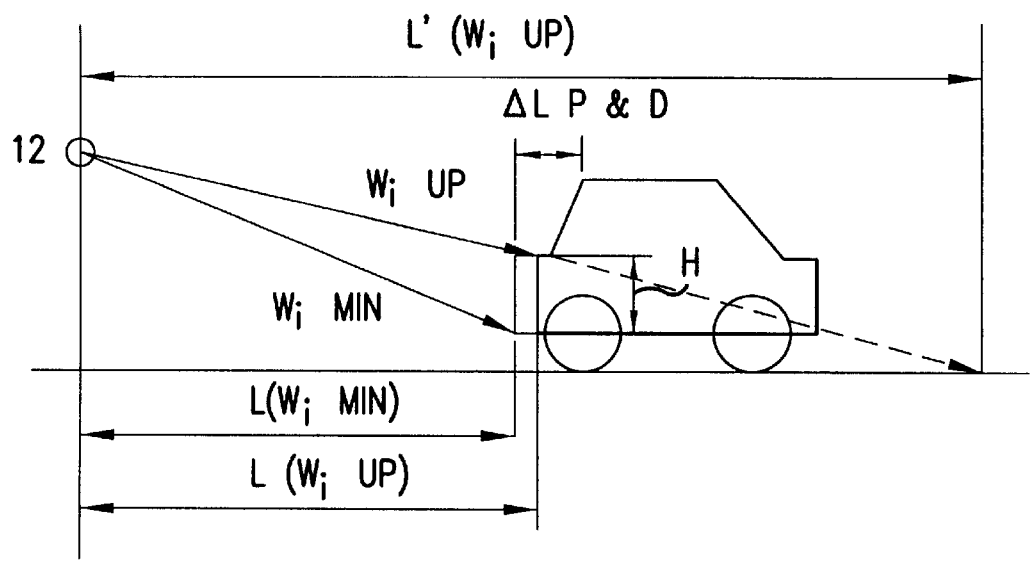
FIG. 10 is a side view showing a relationship between a distance measurement apparatus and a shape of a rear vehicle, for illustrating processing executed by the vehicle extraction section in FIG. 1.
Figure 11:
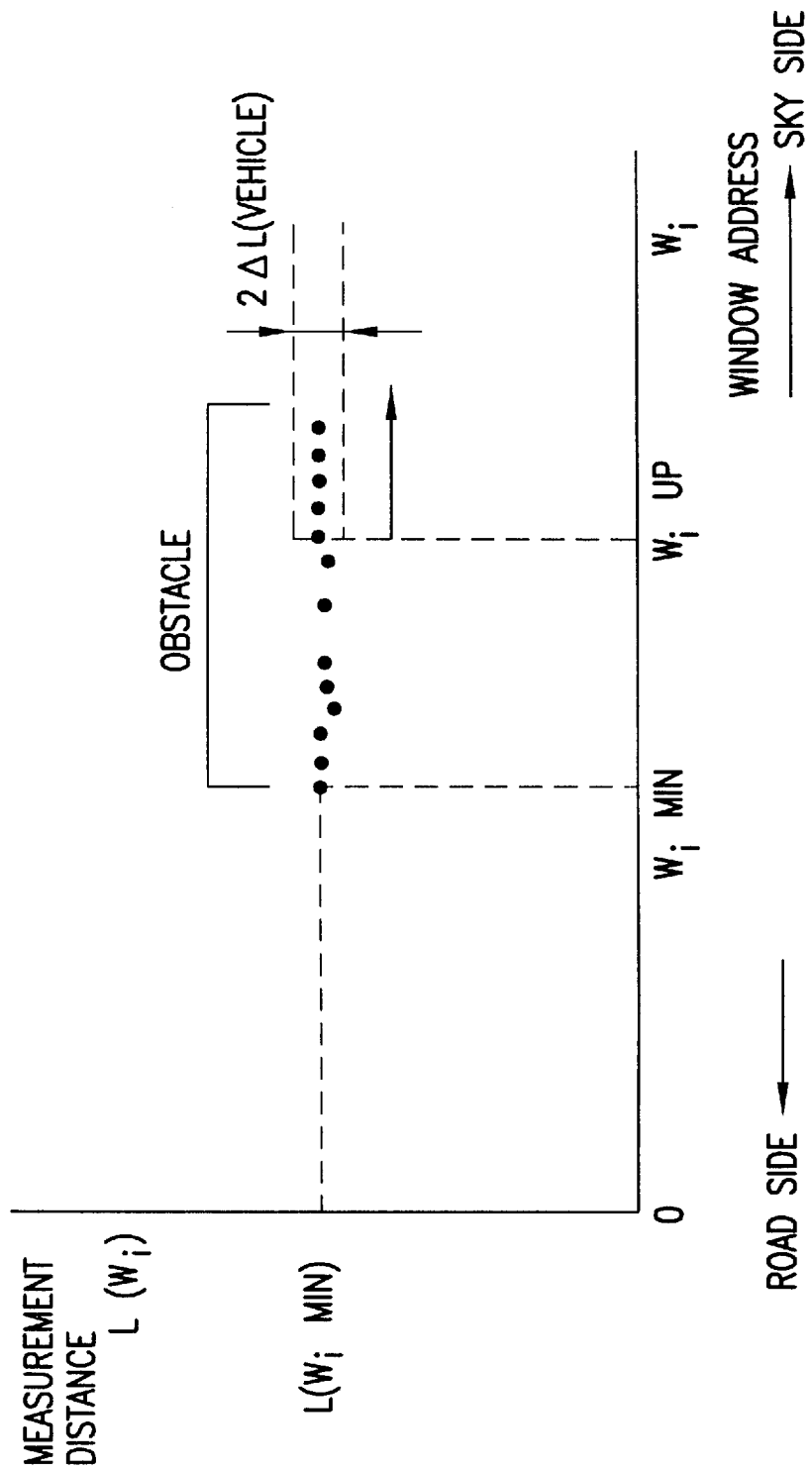
FIG. 11 shows examples of measured distances for respective window addresses on the sensor lines during an extraction of a vehicle candidate, for illustrating processing executed by the vehicle extraction section in FIG. 1.
Figure 12:
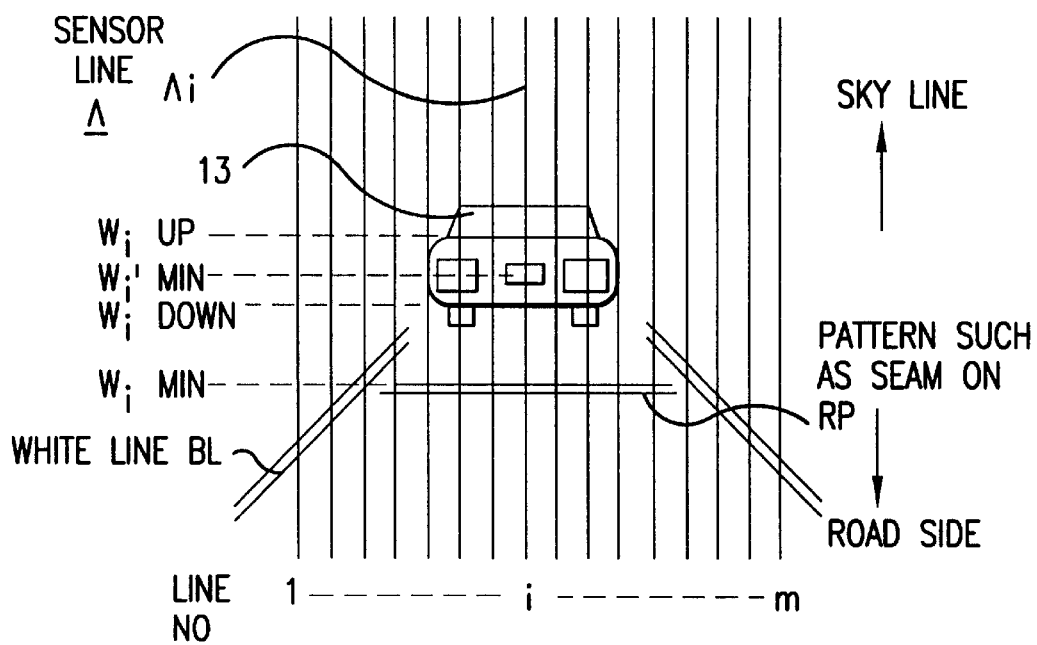
FIG. 12 shows an image of a white line, a pattern, such as a seam, and a vehicle on a road surface formed on a plurality of sensor lines, for illustrating processing executed by the vehicle extraction section in FIG. 1.
Figure 13:
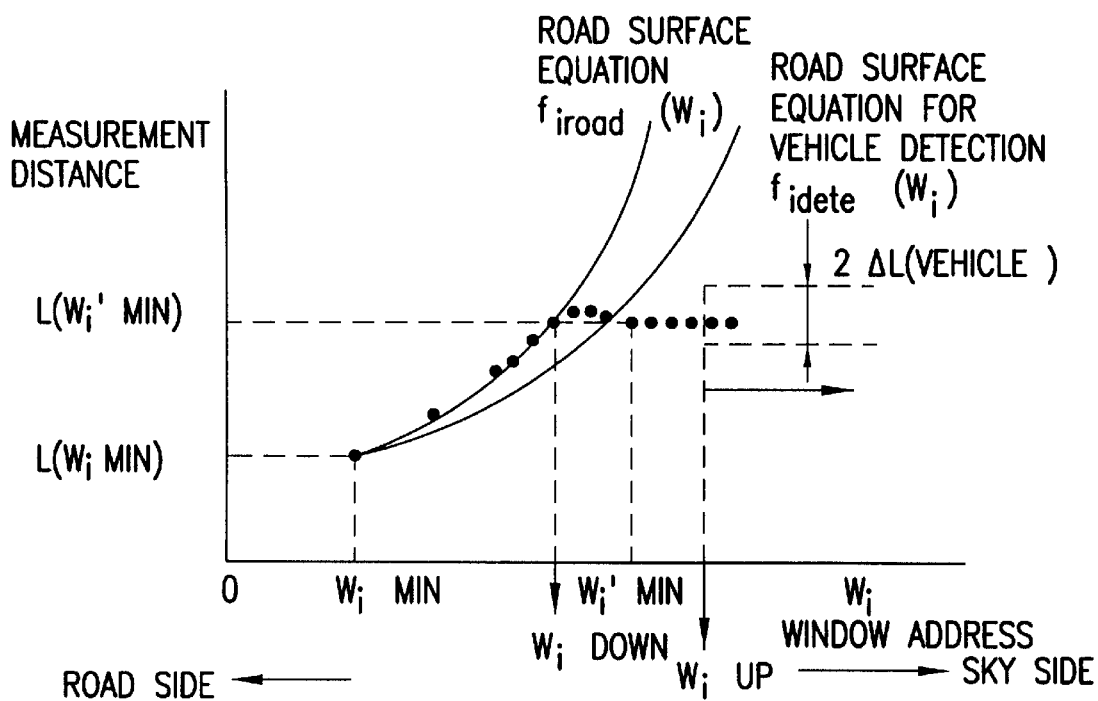
FIG. 13 shows examples of measured distances and road surface expressions for the respective window addresses on the sensor lines having images of a road surface and a vehicle for explaining processing executed by the vehicle extraction section in FIG. 1.
Figure 14:
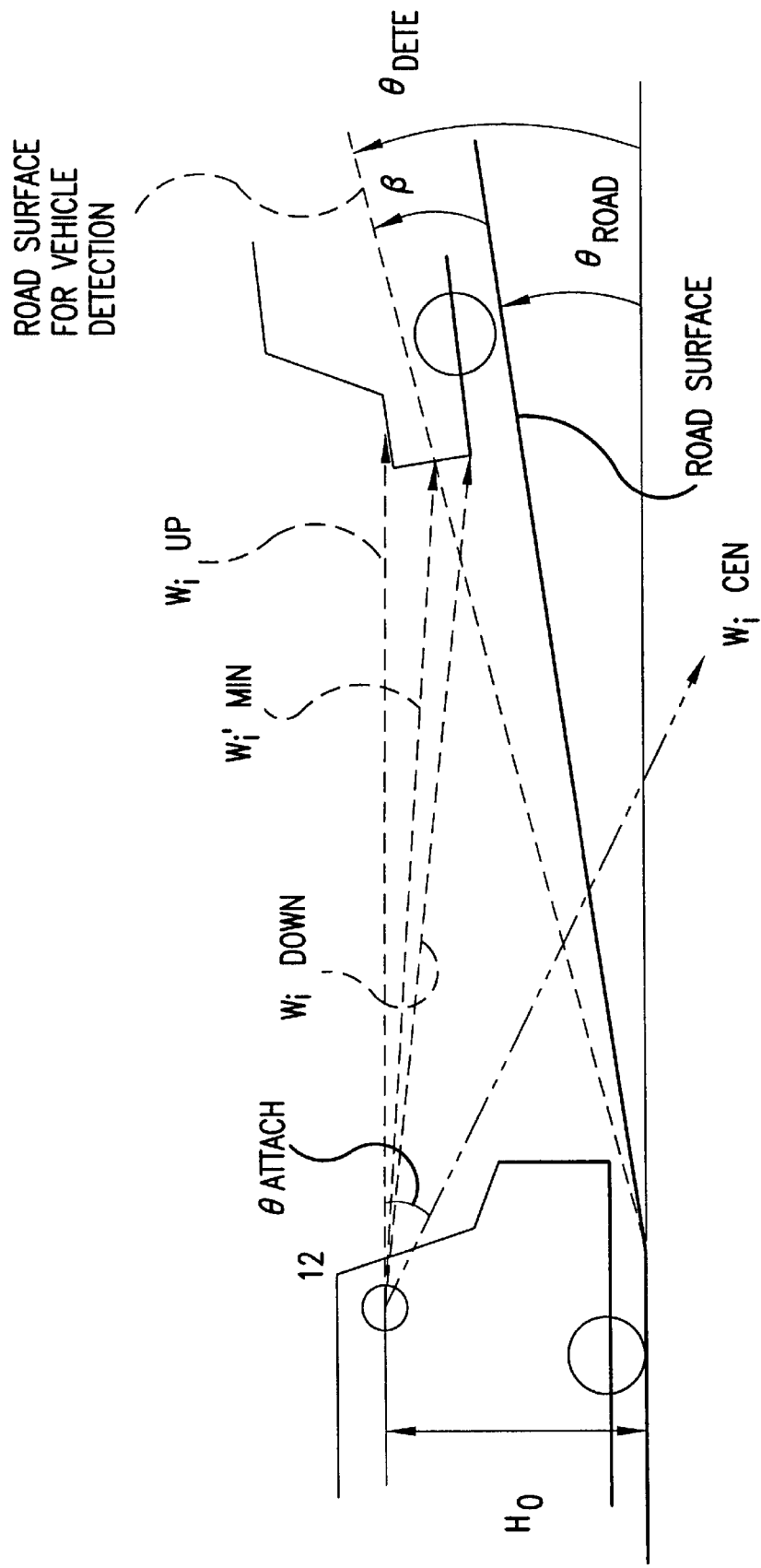
FIG. 14 is a diagram showing the relationship among the distance measurement apparatus, a road surface and a vehicle detection road surface, for illustrating processing executed by the vehicle extraction section in FIG. 1.

FIG. 9 illustrates an explanation of FIGS. 6 to 8, and FIGS. 10 to 14 illustrate an explanation of FIGS. 6 and 7. FIG. 9 shows an example of an image of a white line and a preceding car on a road surface captured by the (m) sensor lines in the optical sensor arrays disposed such that the longitudinal direction is aligned with the vertical direction; FIG. 10 is a side view showing the relationship between the distance measurement apparatus and the shape of the rear part of a vehicle; FIG. 11 shows examples of the measured distances for each of the window addresses on the sensor lines during the extraction of the location of a vehicle; FIG. 12 shows an image of a white line, a pattern, such as a seam, and a vehicle on a road surface captured on the plurality of sensor lines; FIG. 13 shows an example of the measured distances and road surface equations for each of the window addresses on the sensor lines having an image of a road surface and a vehicle; and FIG. 14 is a diagram showing the relationship among the distance measurement apparatus, a road surface and a vehicle detection road surface.

Next, with reference to FIGS. 9 to 14, the operation of the vehicle extraction section 8 is described in FIGS. 6 to 8.

First, in each of those sensor lines for which the white line flag $f_{BL}$(i) is zero, i.e. the white line has not been detected, as shown in the flow chart in FIG. 6, it is determined whether the distance data that may be a candidate for a vehicle is present in that sensor line.

If the white line is not present on the sensor line No. i (FIG. 6, S22, branch Y), it can be assumed that the data in the minimum window address $W_i$min in this sensor line and the corresponding measured distance $L(W_i$min$)$ indicates the distance to a captured pattern on a road surface other than the white line or a part of a vehicle or a lower edge of a vehicle body.

This data is then identified by determining if there is substantially the same distance as the measured distance $L(W_i$min$)$ (in this case, distance within L $(W_i$min$)\pm\Delta$L (Vehicle), but Equation (14) shows a vehicle error length $\Delta L$(Vehicle), described below) in the measurement window at a window address $W_i$up or higher that is higher (elevation) than the minimum window address $W_i$min by a certain number of addresses on the sensor line No. i (FIG. 6, S23 and S24.)

The reason for the above determination is that since an obstacle, such as a vehicle, has a certain height perpendicular to the road surface, as shown in FIGS. 9 and 10, substantially the same distance $L(W_i$up$)$ as the measured distance $L(W_i$min$)$ appears at the window address $W_i$up higher than the minimum window address $W_i$min by a distance equal to the minimum height of the vehicle. On the contrary, if the vehicle is not present at the measured distance $L(W_i$min$)$, the measured distance is $L'(W_i$up$)$ in FIG. 10 at the window address $W_i$up higher than the minimum window address $W_i$min by a distance equal to the minimum height of the vehicle. Thus, $L(W_i$min$)=L'(W_i$up$)$ is not satisfied.

FIG. 11 shows an example of the relationship between the measured distance $L(W_i)$ and each window address $W_i$, including the window addresses $W_i$up higher than the minimum window address $W_i$min as a starting point when an obstacle as a vehicle candidate is determined to be present at the measured distance $L(W_i$min$)$. Equations (13) and (14) for the window address $W_i$up and vehicle error length $\Delta L$(Vehicle) related to the above determination in the flow chart in FIG. 6 are shown below.

$$\Delta L(\text{Vehicle}) = \Delta L\ P\&D + (p/B \cdot f) \cdot \Delta AF \cdot \{L(W_i\text{min})\}^2 \qquad \text{Equation 14}$$

In this equation, $\Delta$AF: (vertical) error at the image forming position on the sensor array, B: optical axis interval, and $\Delta$L P&D: concave and convex sections as seen from the side of the vehicle (see FIG. 10).

The second item on the right side of Equation 14 denotes an error caused by manufacturing variations in the optical sensor arrays.

When the data on the minimum window address $W_i\text{min}$ and the measured distance $L(W_i\text{min})$ for the lowest image of the sensor line in which the white line is not present is determined to be vehicle candidate data (FIG. 6, S24, branch Y), line No. i is determined to indicate a vehicle candidate, and the distance $L(W_i\text{min})$ to the vehicle in line No. i is modified so that $L\text{Vehicle}(i)=L(W_i\text{min})$ (FIG. 7, S27). This processing is executed for all the sensor lines in which the white line is not present (FIG. 7, S28 and S29).

On the other hand, if the data on $W_i\text{min}$ and $L(W_i\text{min})$ for the lowest image of the sensor line in which the white line is not present is determined not to be vehicle candidate data but a pattern RP, such as a seam, on the road surface as shown in FIG. 12 (FIG. 6, S24, branch N), then a road surface equation $f_{iroad}(W_i)$ that expresses a distance on the road surface by using the window address $W_i$ on the sensor line No. i as a variable, as shown by the thin curved line in FIG. 13, is determined by using the following Equation (15) (FIG. 7, S31).

$$f_{iroad}(W_i)=H_o/\{f(W_i)+\tan(\theta_{road})\} \qquad \text{Equation 15}$$

In this equation, $$f(W_i)=\tan\{\theta_{attach}+\tan^{-1}((W_{i\,cen}-W_i)\cdot p/f)\}$$

$\theta$attach: sensor attachment elevation angle(see FIG. 14), $W_{i\,cen}$: window address at the center of sensor line No. i, $H_o$: attachment height of the distance measurement apparatus from the road surface (see FIG. 14), $\theta_{road}$: angle of the road surface expressed by the following equation (see FIG. 14):

$$\theta_{road}=\tan^{-1}\{(H_o/L(W_i\text{min}))-\tan(\theta_{wi}\text{min})\}$$

$\theta_{wi}\text{min}$: angle of the distance direction of the minimum window address $W_i\text{min}$ relative to the horizontal direction, as shown by the following equation:

$$\theta_{wi}\text{min}=\theta_{attach}+\tan^{-1}((W_{i\,cen}-W_i\text{min})\cdot p/f)$$

A road surface equation $f_{iroad}(W_i)$ given by Equation (15) is used to create a vehicle extraction road surface equation $f_{idete}(W_i)$ (FIG. 7, S32). This vehicle extraction road surface equation can be given as the following Equation (16):

$$f_{idete}(W_i)=H_o/\{f(W_i)+\tan(\theta_{dete})\} \qquad \text{Equation 16}$$

wherein $\theta_{dete}=\theta_{road}+\beta$: vehicle extraction road surface angle ($\beta$ is a constant).

The vehicle extraction road surface equation $f_{idete}(W_i)$ is shown by the thick curved line in FIG. 13 and used to detect a vehicle by assuming an imaginary road surface consisting of a slope of an angle relative to the actual angle of the road surface. This imaginary road surface, i.e. vehicle extraction road surface, is expressed by the dotted line in FIG. 14. The window address $W_i'\text{min}$ crossing the vehicle extraction road surface is shown in FIGS. 13 and 14 and can be determined to be the minimum window address that satisfies Equation (17) when the measured distance for each window address $W_i$ is referred to as $L(W_i)$. At the same time, a distance $L(W_i'\text{min})$ at the minimum window address can be detected (FIG. 7, S33).

$$f_{idete}(W_i) \geq L(W_i) \qquad \text{Equation 17}$$

The data on the window address $W_i'\text{min}$ can be assumed to indicate a certain obstacle perpendicular to the road surface, and whether this obstacle is a vehicle candidate is then confirmed. The window address at which the distance in the road surface equation $f_{iroad}(W_i)$, i.e. thin curved line in FIG. 13, is equal to $L(W_i'\text{min})$ is determined and referred to as $W_i\text{down}$, and $W_i\text{down}$ and $L(W_i'\text{min})$ are used to determine the window address $W_i\text{up}$. This can be determined by the following Equation (18), as in Equation (13):

$$W_i\text{up}=W_i\text{down}+\Delta W\text{up} \qquad \text{Equation 18}$$

wherein $\Delta W\text{up}=\{H\cdot f/(p\cdot L(W_i'\text{min}))\}+w$

As shown in FIG. 14, $W_i\text{down}$ is the window address for the lower end of the vehicle, while $W_i\text{up}$ represents the window address for the upper part of the vehicle. As described above, if a measured distance that can fit within $L(W_i'\text{min})\pm\Delta L(\text{Vehicle})$ is present at the address $W_i\text{up}$ or higher that is higher than the lower end of the vehicle by a certain height, sensor line No. i may be assumed to contain the vehicle. $\Delta L(\text{Vehicle})$ can be determined by using $L(W_i\text{min})=L(W_i'\text{min})$ in Equation (14) (FIG. 7, S34 to S36).

In this manner, when $W_i'\text{min}$ is determined to be a vehicle candidate window address, sensor line No. i is determined to contain the vehicle, so it is possible to set the distance to the vehicle at sensor line No. i as $L\text{Vehicle}(i)=L(W_i'\text{min})$ (FIG. 7, S37). The processing in steps S31 to S37 is executed for all the vehicle candidate sensor lines (FIG. 7, S28 and S29).

Once the candidate value of the distance to the vehicle $L\text{Vehicle}(i)$ has been extracted for each sensor line in steps S27 and S37 shown in FIG. 7 in this manner, the processing in FIG. 8 is executed to extract the location of the vehicle by using the inter line correlation. Next, the procedure in FIG. 8 is explained.

First, the minimum data of $L\text{Vehicle}(i)$ is referred to as LDET (FIG. 8, S41 and S42). The value of $\Delta$LDET is determined by using the following Equation (19), and the minimum Lmin LDET and maximum Lmax LDET values for the number of lines contained in the image of the vehicle are determined by using the following Equations (20) and (21) (FIG. 8, S43):

$$\Delta L\text{DET}(p/B\cdot f)\cdot\Delta AF\cdot(L\text{DET})^2 \qquad \text{Equation 19}$$

$$L\min L\text{DET}=\text{WIDTHVehiclemin}\cdot f/(L\text{DET}\cdot LP) \qquad \text{Equation 20}$$

$$L\max L\text{DET}=\text{WIDTHVehiclemax}\cdot f/(L\text{DET}\cdot LP) \qquad \text{Equation 21}$$

In this equation,

WIDTHVehiclemin: minimum width of the vehicle,

WIDTHVehiclemax: maximum width of the vehicle, and

LP: pitch between the sensor array lines.

The data on $L\text{Vehicle}(i)$ within the range of the distance LDET$\pm\Delta$LDET is then determined to indicate one vehicle, and in this case, the minimum and maximum numbers of the lines that meet these conditions are referred to as L#MIN and L#MAX, respectively (FIG. 8, S44 and S45).

If L#MIN, L#MAX, and Equations (19) to (21) meet the conditions of the following Equation (22) (FIG. 8, S46, branch Y), this data is determined to indicate the vehicle, as it satisfies the condition for the vehicle. The average values of the $L\text{Vehicle}(i)$ of the sensor lines which satisfy the conditions are referred to as an inter-vehicle distance DISTVehicle (hereinafter referred to as "DV") (FIG. 8, S47).

$$L\min L\text{DET} \leq L\#\text{MAX}-L\#\text{MIN}+1 \leq L\max L\text{DET} \qquad \text{Equation 22}$$

The direction of the vehicle is referred to as ANGLEVehicle and is calculated by using the following Equation (23) (FIG. 8, S48):

$$\text{ANGLEVehicle}=\tan^{-1}\{p\cdot(\text{linepos}-\text{linecent})/f\} \qquad \text{Equation 23}$$

In this equation, linepos=(L#MAX+L#MIN)/2 linecent=(1+m)/2

In FIG. 9, if the vehicle 13 is present on the sensor line Λ with a central line No., the direction of the vehicle ANGLEVehicle is 0°. If the vehicle 13 is present on a sensor line Λ with a line No. closer to (m), the direction of the vehicle ANGLEVehicle is expressed as (+). If the vehicle 13 is present on a sensor line with a line No. closer to 1, the direction of the vehicle ANGLEVehicle is expressed as (−).

If, in step S46 in FIG. 8, the data is not determined to indicate a vehicle (branch N), the next smallest data of LVehicle(i) is set as LDET, and the same procedure as described above is used to make a determination. In this manner, until the location of the vehicle has been extracted, the next smallest data of LVehicle(i) is sequentially set as LDET and the same determination is made to extract the location of the vehicle (FIG. 8, S49 to S51).

As described above, the vehicle extraction section 8, and thus the distance measurement apparatus 12, can output the inter-vehicle distance and vehicle direction information 11.

The first invention described above determines the inter-vehicle distance to a preceding or following vehicle and its direction. An embodiment of a second invention relating to a connection to an alarm device that effectively uses such information for an alarm is described with reference to FIGS. 19 to 22.

Figure 19:
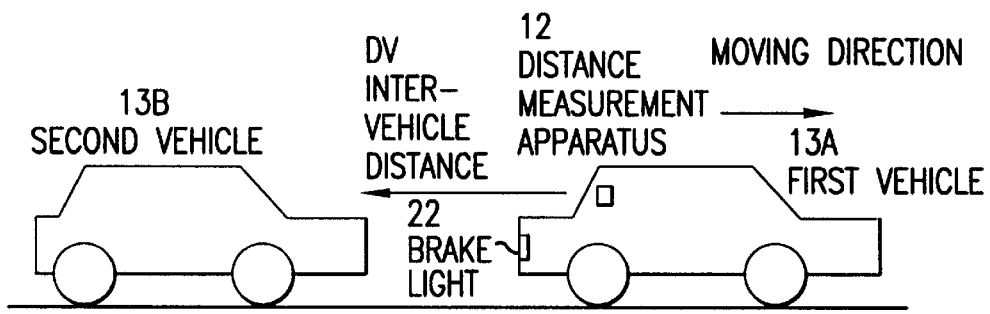
FIG. 19 is a side view showing the relationship between a vehicle and a following vehicle as a second embodiment of the invention.
Figure 20:
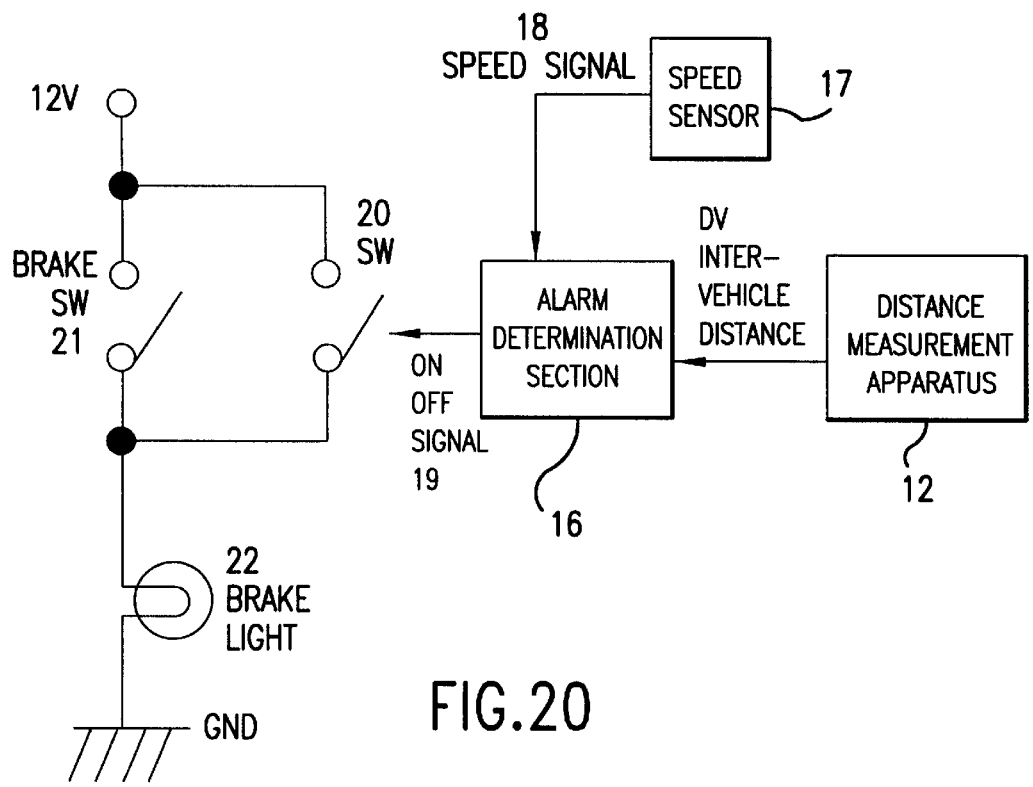
FIG. 20 is a block circuit diagram showing a structure of an alarm device.

FIG. 19 is a side view showing a first vehicle and a second vehicle that follows the first vehicle as a first embodiment of the second invention. FIG. 20 shows connections in an alarm device in the first vehicle. The distance measurement apparatus 12 is mounted at the rear of the first vehicle 15 to measure at least the inter-vehicle distance DV to the following vehicle 13B. The distance measurement apparatus 12 is connected to an alarm determination section 16 to output the inter-vehicle distance DV thereto.

The alarm determination section 16 is connected to a vehicle speed sensor 17 and repeatedly provides ON/OFF instructions to a switch 20 connected parallel to a brake switch 21 in the vehicle (switches are hereinafter referred to as "SWs") only if the following vehicle comes close to a safe inter-vehicle distance determined by the speed of the first vehicle and the relative speed based on a vehicle speed signal 18 from the vehicle speed sensor 17, the inter-vehicle distance DV, and Equation (7) shown in the Prior Art section. Thus, a brake light 22 is flashed.

As stated above, even if the driver of the first vehicle has not applied the brake and the brake SW 21 has not been turned on, the brake light 22 is flashed to alert the following vehicle 133.

Figure 21:
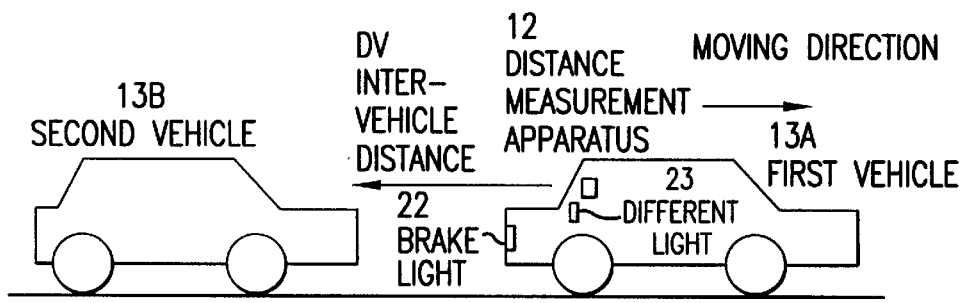
FIG. 21 is a side view showing a relationship between a vehicle and a following vehicle as a third embodiment of the invention.
Figure 22:
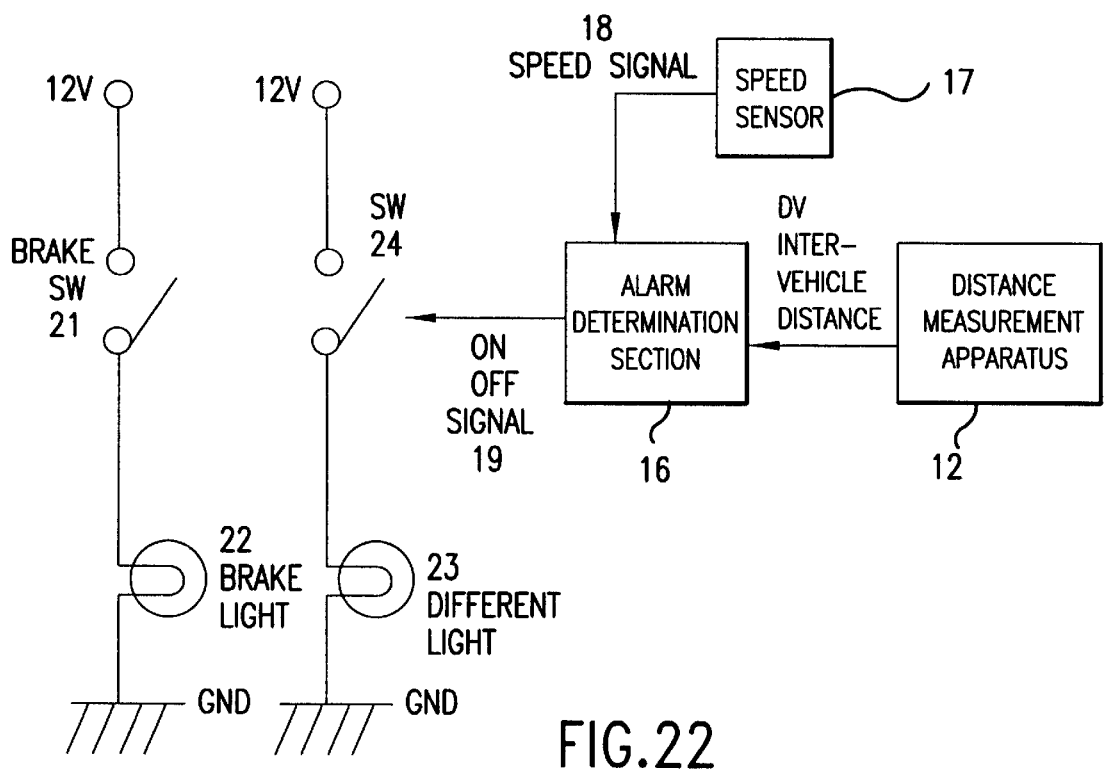
FIG. 22 is a block circuit diagram showing a structure of an alarm device.
Figure 23:
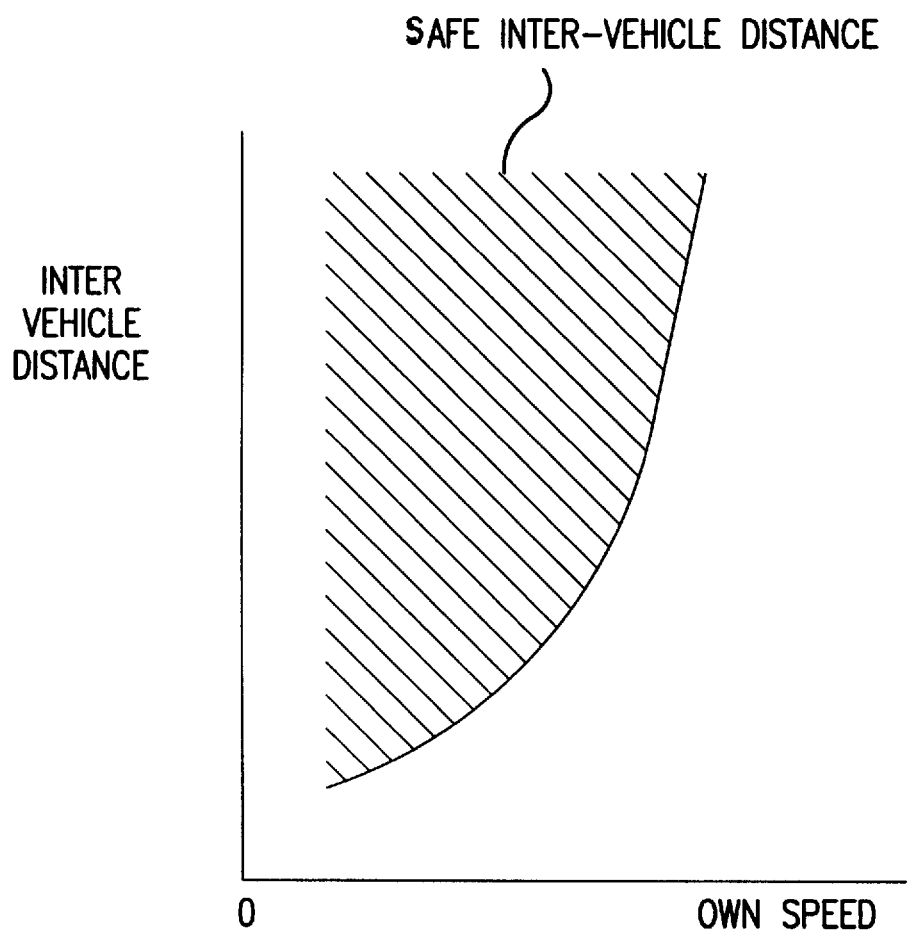
FIG. 23 shows a relationship between the speed of a vehicle and a safe inter-vehicle distance at a certain relative speed.
Figure 24:
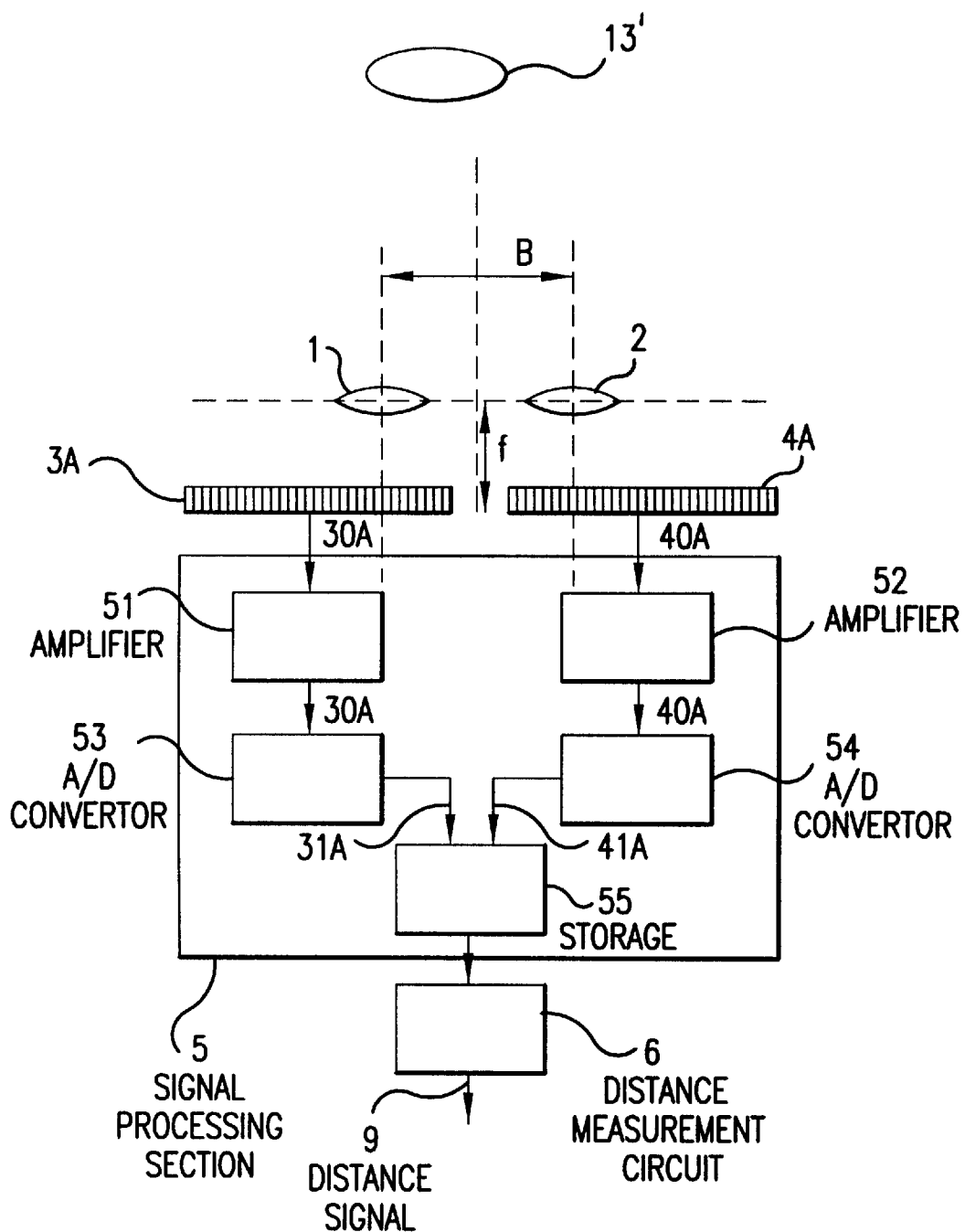
FIG. 24 shows a structure of a conventional inter-vehicle distance measurement apparatus.
Figure 25:
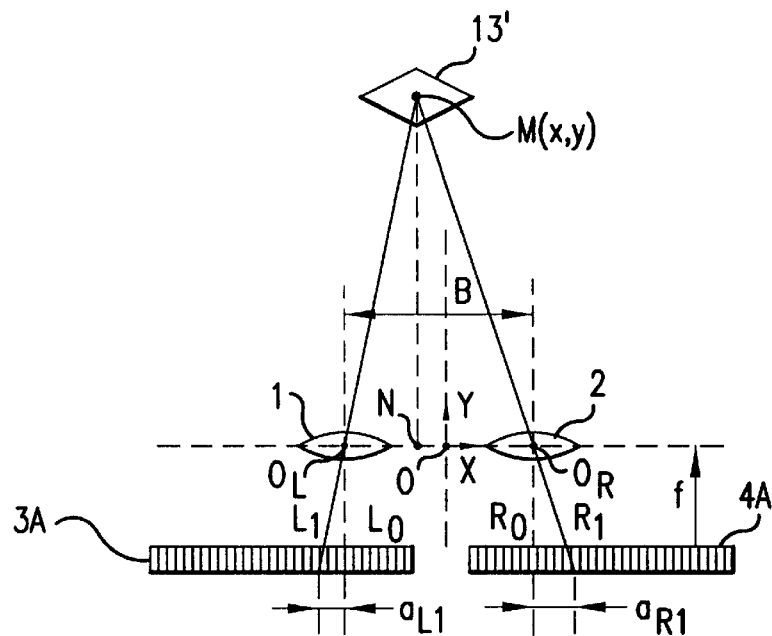
FIG. 25 shows a principle of a distance calculation in FIG. 24.
Figure 26:
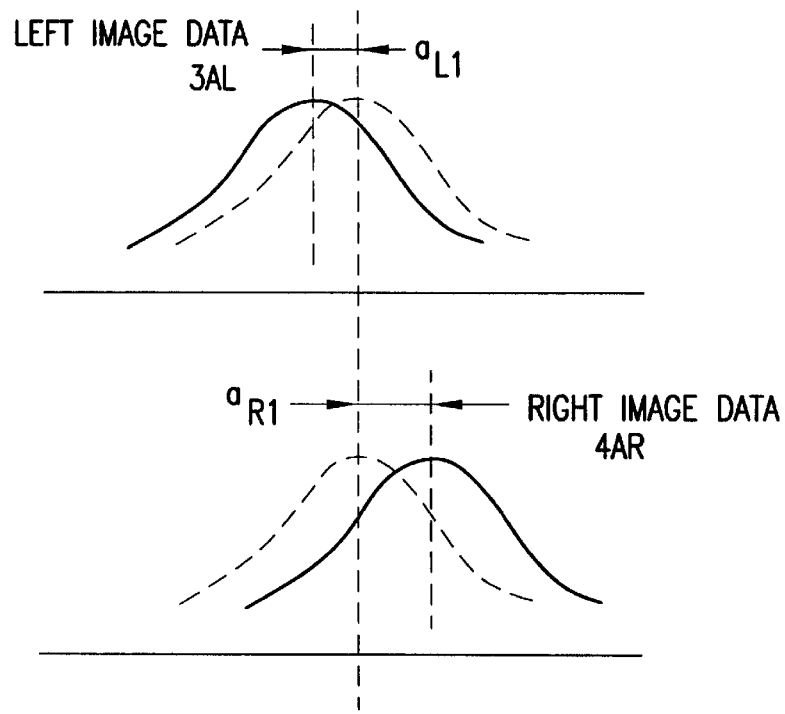
FIG. 26 shows a principle of an operation of a distance detection circuit in FIG. 24.
Figure 27:
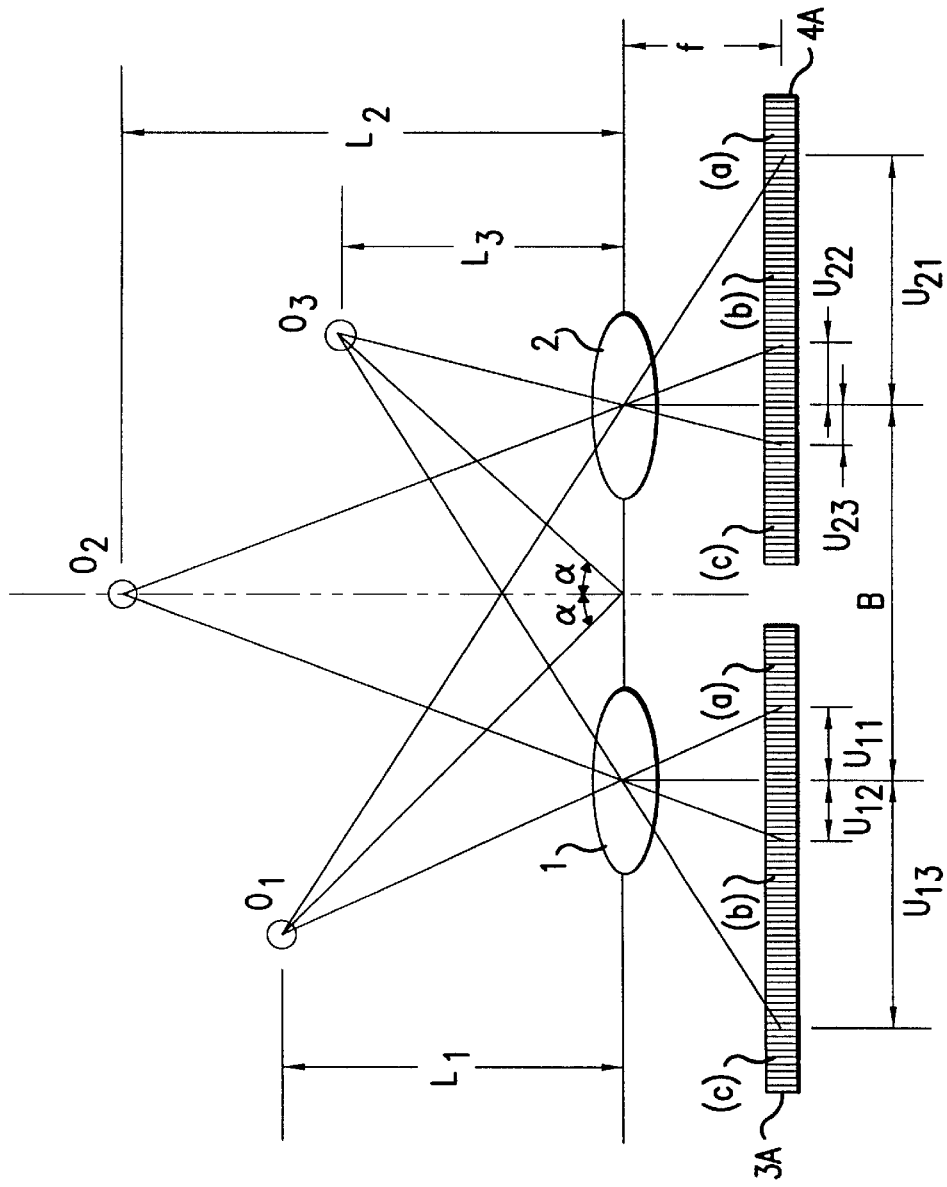
FIG. 27 shows a principle for measuring the distances for a plurality of points in the longitudinal direction of the conventional optical sensor arrays.
Figure 28:
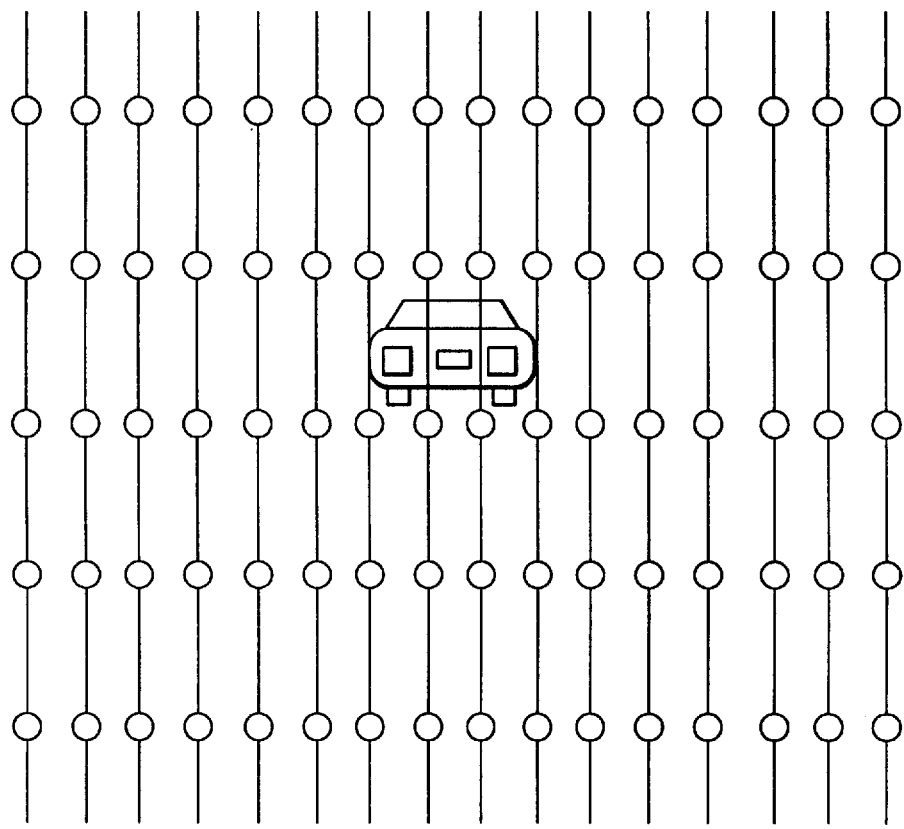
FIG. 28 shows inconveniences occurring when the conventional inter-vehicle distance measurement apparatus extracts a location of a vehicle.

FIG. 21 is a side view showing a first vehicle and a second vehicle that follows the first vehicle as a different embodiment of the second invention. FIG. 22 shows connections in an alarm device in the first vehicle. This embodiment differs from the first embodiment in that a light 23 different from the brake light 22 is provided as a warning light for the following vehicle, and the alarm determination section 16 provides ON/OFF instructions to a SW 24 that can turn the light 23 on and off. This structure enables the following vehicle to be alerted by flashing the different light 23 regardless of whether the driver applies the brakes.

According to the first invention, a plurality of measurement windows is located on each of the sensor lines in a plurality of sensor arrays disposed such that the longitudinal direction is approximately aligned with the vertical direction. Distance information (plurality of coordinates at consecutive addresses) is calculated for each measurement window to detect sensor lines in which a white line is present through the use of the distance information, and the location of a vehicle is extracted from the distance information for those sensor lines in which the white line is not present in order to calculate the inter-vehicle distance and the direction of the vehicle.

In detecting the sensor lines containing the white line and extracting the location of a vehicle, candidate data is selected in each sensor line before the correlation among the sensor lines is examined. Thus, a minimum amount of information is processed and the processing can be promptly executed.

In addition, since the plurality of measurement windows is located on each sensor line at an interval in pixels, a vehicle located far away from its own vehicle can be reliably captured by the measurement windows.

In addition, by using the sensor lines other than those containing the white lines, only the vehicle present in the same lane, i.e. object (vehicle) to be alerted, can be reliably captured, thereby increasing the reliability of the alarm and reducing the processing time because the sensor lines containing the white lines are not used to extract the location of the vehicle.

Consequently, the first invention provides an inter-vehicle distance measurement apparatus that provides reliable data that is easy to process, thereby reducing processing time and costs without need for expensive processing circuits.

Furthermore, according to the second invention, the inter-vehicle distance measurement apparatus measures the distance to a following car in order to alert it by flashing the brake lights if it enters in the dangerous inter-vehicle region.

Thus, the method provides an alarm without bothering the driver, as in audio alarms, and provides a safety device acceptable to the driver, thereby reducing the occurrence of traffic accidents.

What is claimed is:

1. An inter-vehicle distance measurement apparatus for measuring a distance from a first vehicle to a second vehicle, comprising:

an optical system having a pair of parallel optical axes, a pair of light receiving devices including (m) optical sensor arrays disposed in parallel at a specified interval such that a longitudinal direction of each of the sensor arrays substantially becomes a vertical direction, and (n) measurement windows set on the respective optical sensor arrays, said light receiving devices being disposed in the longitudinal direction of the optical sensor arrays on image forming surfaces of the pair of the parallel optical axes to obtain image data from the optical sensor arrays, distance detection means to detect distances at (m×n) points, coordinates of which are specified by sensor line numbers and measurement window addresses, white line detection means connected to the distance detection means, said white line detection means detecting, through detection results obtained by the distance detection means, an optical sensor array among said (m) optical sensor arrays in which an image of a white line is present on a surface of a road where a first vehicle is travelling, and vehicle detection means connected to the white line detection means and the distance detection means, said vehicle detection means detecting a presence of a second vehicle through detection results of the distance detection means for an optical sensor array among said (m) optical sensor arrays where an image of the white line is absent, and detecting at least an inter-vehicle distance to the second vehicle.

2. An inter-vehicle distance measurement apparatus according to claim 1, wherein an interval for the measurement windows set on each of said optical sensor arrays is equal to an interval between optical sensors in the optical sensor arrays.

3. An inter-vehicle distance measurement apparatus according to claim 1, wherein said white-line detection means detects the white line by examining a correlation in the optical sensor arrays between a measurement distance at which a measurement window is located at a lowest position among measurement distances detected on the optical sensor arrays and an address of that measurement window.

4. An inter-vehicle distance measurement apparatus according to claim 1, wherein said vehicle detection means judges for all the optical sensor arrays in which an image of the white line is absent whether a nearest measured distance corresponds to one of a vehicle candidate and a road surface, based on the nearest measured distance at which a measurement window is located at a lowest position among the measured distances detected on one optical sensor array, and a measured distance from a measurement window at an address higher than a starting point window address of the measurement window with the nearest measured distance by at least a number of addresses corresponding to a height of a vehicle possibly present at the nearest measured distance;

said vehicle detection means determining, if the nearest measured distance is judged to be the vehicle candidate, the nearest measured distance as a vehicle candidate distance and a relevant optical sensor array as a vehicle detection candidate sensor line;

said vehicle detecting means calculating, if the nearest measured distance is determined to be the road surface, a relationship between an address of each higher measurement window from the starting point window address and an expected distance to the road surface at that address, comparing the expected distance to the expected road surface with a corresponding measured distance in order to determine whether a vehicle candidate is present at a distance greater than the nearest measured distance, and determining, if there is the vehicle candidate, the measured distance to the vehicle candidate as the vehicle candidate distance and the relevant optical sensor array as the vehicle detection candidate sensor line; and said vehicle detection means confirming that a difference between maximum and minimum numbers of the vehicle detection candidate sensor lines corresponds to a width of the second vehicle possibly present at the vehicle candidate distance, and determining that the vehicle candidate is the second vehicle.

5. An inter-vehicle distance measurement apparatus, comprising:

means for measuring an intervehicle distance from a front vehicle to a following vehicle, said measuring means including an optical system having a pair of parallel optical axes; and a pair of light receiving devices having at least one optical sensor array disposed such that a longitudinal direction of the optical sensor array substantially becomes a vertical direction, said light receiving devices being disposed in the longitudinal direction of the optical sensor array on image forming surfaces of the pair of the parallel optical axes to obtain the inter-vehicle distance based on image data from the optical sensor array, and alarm output determination means connected to the measuring means, said alarm output determination means determining a dangerous approach of the following vehicle based on the inter-vehicle distance to the following vehicle and a speed of the front vehicle, and informing the following vehicle of the dangerous approach by flashing lights of the front vehicle.

6. An inter-vehicle distance measurement apparatus according to claim 5, wherein said alarm output determination means provides on and off signals for a switch connected parallel to a brake switch operated by a driver to flash brake lights.

7. An inter-vehicle distance measurement apparatus according to claim 5, wherein said alarm output determination means provides on and off signals for a switch to open and close a light different from a brake light located at a portion where a driver in the following vehicle can perceive the light.

* * * * *

UNITED STATES PATENT AND TRADEMARK OFFICE
CERTIFICATE OF CORRECTION

PATENT NO.   : 5,874,904
DATED        : February 23, 1999
INVENTOR(S)  : Takehide Hirabayashi, Hideo Shimizu, Taichi Tanigawa, Akihiko Okabe, Takayuki Usuda It is certified that error appears in the above-indentified patent and that said Letters Patent is hereby corrected as shown below:

```
    In column 2, line 19, change "3AT" to --3AL--;
                line 33, change "Within" to --within--;
    In column 7, line 19, change "LB" to --18--;
    In column 10, line 13, change "3m" to --30m--;
                  line 59, after "figure" add --)--;
    In column 11, line 39, change "(f)(i,j)" to --f(i,j)--;
                  line 41, change "f(k,j)" to --f(i,j)--;
    In column 14, line 44, change "=" to --≐--;
    In column 14, below line 54, add the following paragraph:
       --Equation 13
            Wᵢup = Wᵢmin + Wup
       In this equation,
            Wup = {H·f/(p·L(Wᵢmin))} + w
            H: minimum height with a margin provided at the
               lower side (see Fig. 10),
            f: focal length of the lens,
            p: pixel pitch of the sensor array, and
            w: width of the measurement window in pixels.--;
            and
    In column 17, line 50, change "133" to --13B--.
```

Signed and Sealed this

Twenty-fourth Day of August, 1999

Attest:

Q. TODD DICKINSON

*Attesting Officer*    *Acting Commissioner of Patents and Trademarks*